US010355570B2

(12) United States Patent
Inoue et al.

(10) Patent No.: US 10,355,570 B2
(45) Date of Patent: Jul. 16, 2019

(54) OUTER ROTOR-TYPE AXIAL GAP BRUSHLESS MOTOR

(71) Applicant: Kobe Steel, Ltd., Hyogo (JP)

(72) Inventors: Kenichi Inoue, Kobe (JP); Hiroaki Kawai, Kobe (JP); Koji Inoue, Kobe (JP); Takashi Hiekata, Kobe (JP); Kazuhide Sekiyama, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 176 days.

(21) Appl. No.: 15/514,954

(22) PCT Filed: Aug. 20, 2015

(86) PCT No.: PCT/JP2015/073411
§ 371 (c)(1),
(2) Date: Mar. 28, 2017

(87) PCT Pub. No.: WO2016/067718
PCT Pub. Date: May 6, 2016

(65) Prior Publication Data
US 2017/0237327 A1    Aug. 17, 2017

(30) Foreign Application Priority Data

Oct. 27, 2014  (JP) .................. 2014-217978

(51) Int. Cl.
H02K 21/24    (2006.01)
H02K 1/20     (2006.01)
H02K 3/24     (2006.01)
H02K 16/02    (2006.01)
H02K 1/27     (2006.01)
(Continued)

(52) U.S. Cl.
CPC .............. H02K 21/24 (2013.01); H02K 1/20 (2013.01); H02K 1/2786 (2013.01);
(Continued)

(58) Field of Classification Search
CPC ........ H02K 21/24; H02K 1/20; H02K 1/2793; H02K 3/24; H02K 9/193; H02K 9/197; H02K 16/02
(Continued)

(56) References Cited

U.S. PATENT DOCUMENTS 6,262,503 B1    7/2001  Liebman et al.
6,768,239 B1 *  7/2004  Kelecy ................. H02K 3/04
                                                      310/179

(Continued)

FOREIGN PATENT DOCUMENTS

JP    2006-014564 A    1/2006
JP    2006-050752 A    2/2006
(Continued)

OTHER PUBLICATIONS

International Search Report issued in PCT/JP2015/073411; dated Nov. 17, 2015.
(Continued)

Primary Examiner — Burton S Mullins
(74) Attorney, Agent, or Firm — Studebaker & Brackett PC

(57) ABSTRACT

In the outer rotor-type axial gap brushless motor of the present invention, each of a plurality of coils provided to a stator is constituted by winding a band-shaped conductor member via an insulating member such that the width direction of the conductor member runs along the axial direction of the coil, and each coil has a through passage which penetrates in the axial direction of the coil and which is included between prescribed turns in a portion of the coil that corresponds to the outer side in the radial direction of the stator relative to a core portion of the coil.

4 Claims, 13 Drawing Sheets

(51) Int. Cl.
  *H02K 9/10* (2006.01)
  *H02K 9/193* (2006.01)
  *H02K 9/197* (2006.01)

(52) U.S. Cl.
  CPC ............. *H02K 1/2793* (2013.01); *H02K 3/24* (2013.01); *H02K 9/10* (2013.01); *H02K 9/193* (2013.01); *H02K 9/197* (2013.01); *H02K 16/02* (2013.01)

(58) Field of Classification Search
  USPC .......................... 310/156.32, 156.36, 156.37
  See application file for complete search history.

(56) References Cited

U.S. PATENT DOCUMENTS

| | | | |
|---|---|---|---|
| 7,705,508 B2* | 4/2010 | Dooley | ................... H02K 9/19 310/208 |
| 2010/0148611 A1 | 6/2010 | Wang et al. | |
| 2010/0218918 A1 | 9/2010 | Sonohara | |
| 2011/0309694 A1 | 12/2011 | Woolmer | |
| 2013/0009508 A1 | 1/2013 | Takamatsu et al. | |
| 2014/0070638 A1* | 3/2014 | Brennvall | ................ H02K 3/47 310/54 |

FOREIGN PATENT DOCUMENTS

| | | |
|---|---|---|
| JP | 2012-050312 A | 3/2012 |
| JP | 5128538 B2 | 1/2013 |
| WO | 2010/071441 A1 | 6/2010 |
| WO | 2012/128646 A1 | 9/2012 |

OTHER PUBLICATIONS

International Preliminary Report on Patentability issued in PCT/JP2015/073411; dated May 11, 2017.

Extended European Search Report issued by the European Patent Office dated May 7, 2018, which corresponds to EP15855851.0-1201 and is related to U.S. Appl. No. 15/514,954.

* cited by examiner

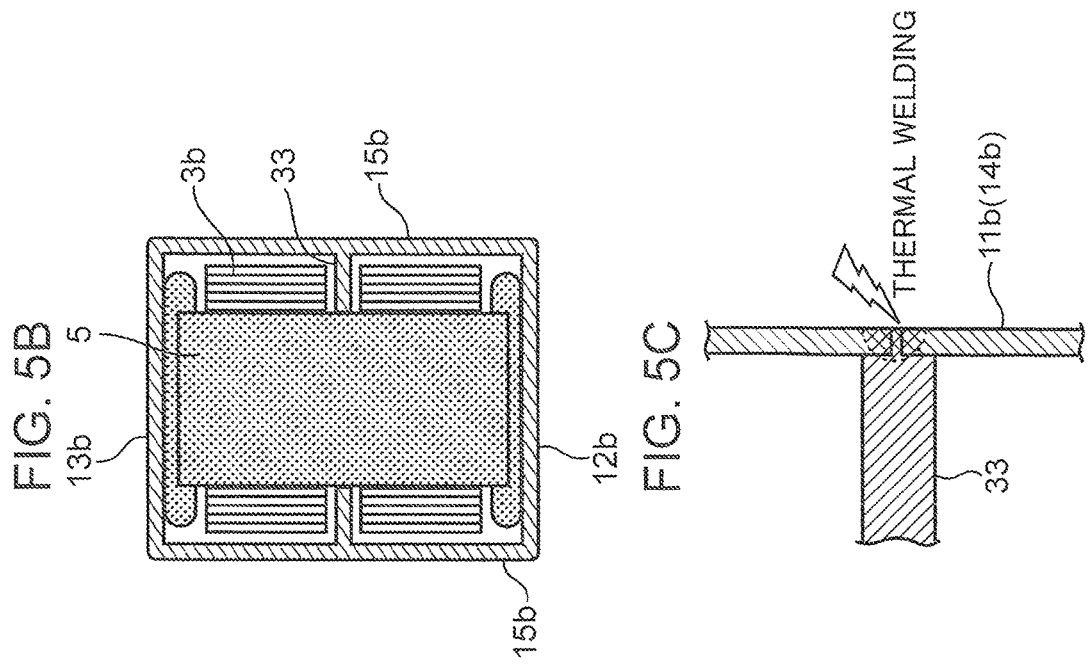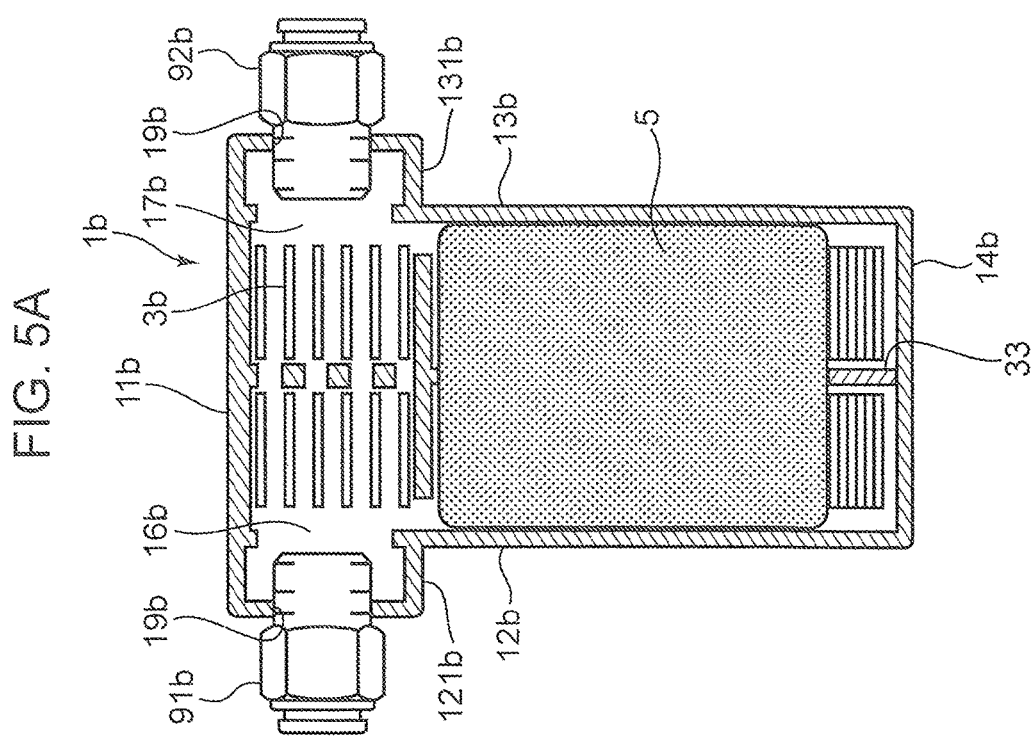

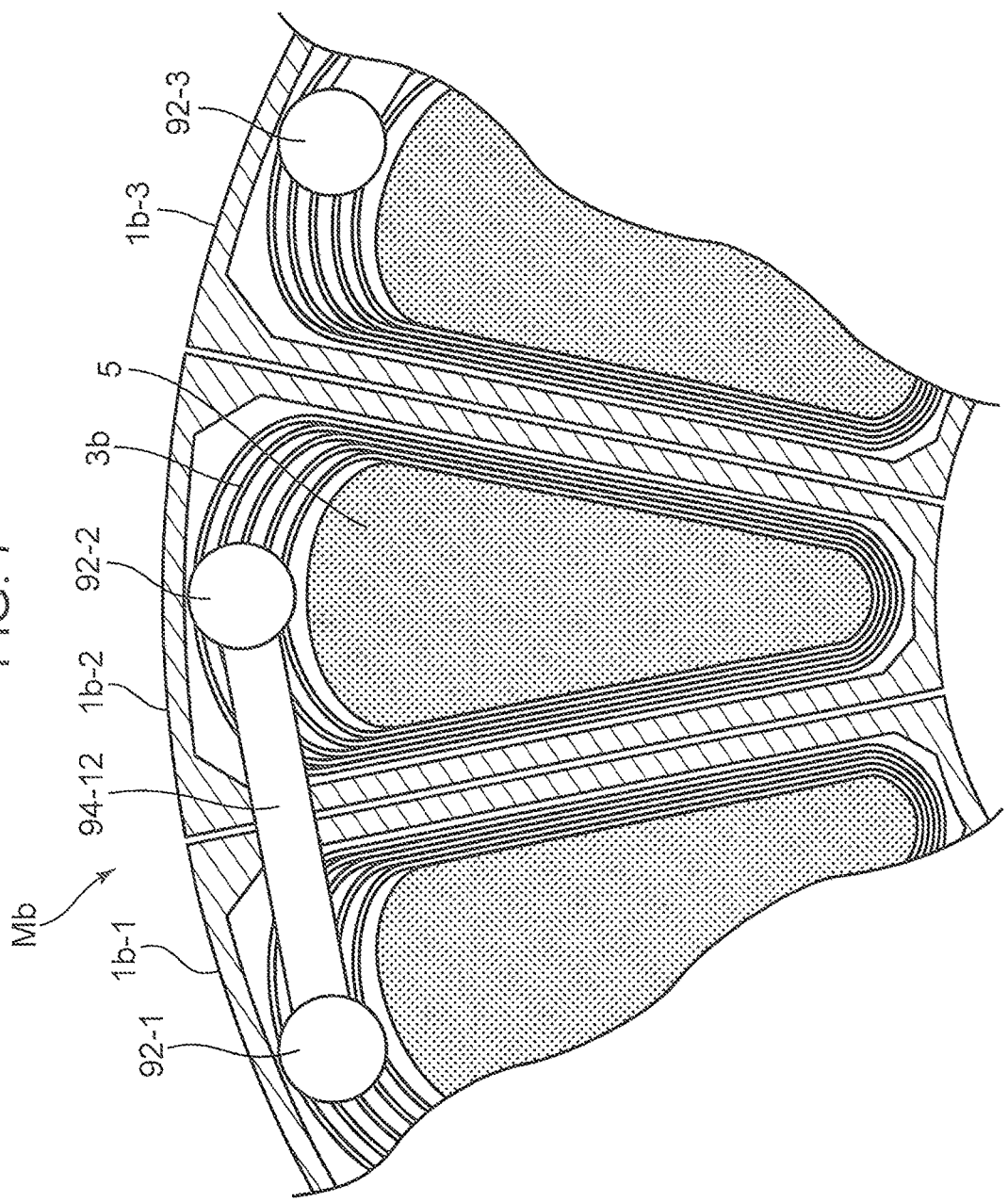

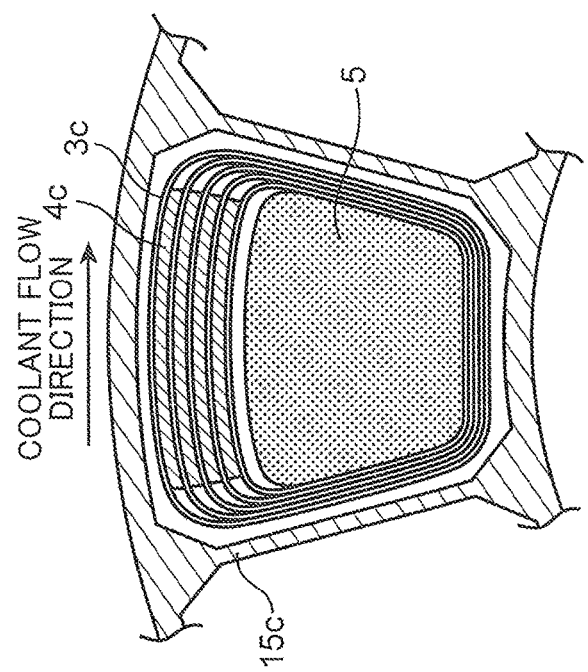
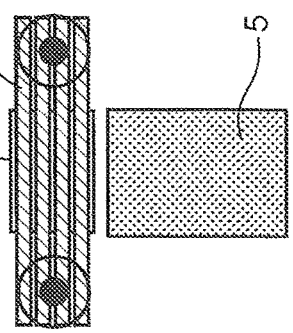
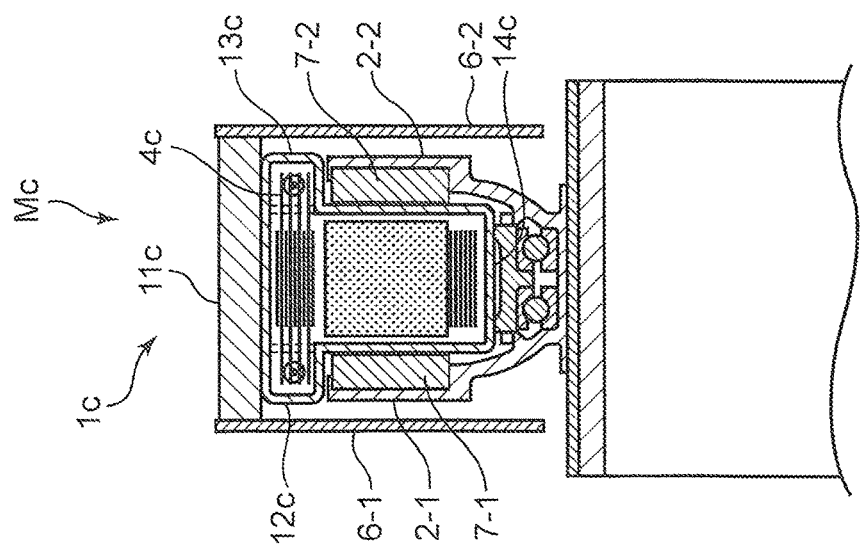

FIG. 13

| Model No. | I | II | III | IV |
|---|---|---|---|---|
| Winding Form | Thin round wire | Edgewise | Edgewise + Flange | Flatwise |
| Cooling method | Immersion | Forced (Outer surface) | Forced (Outer surface) | Forced |
| Distribution of magnetic field (lines of magnetic induction) | 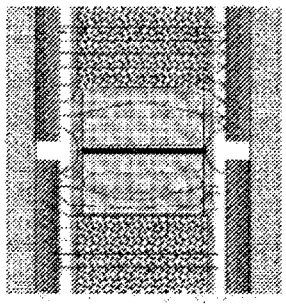 | 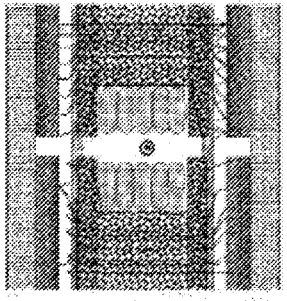 | 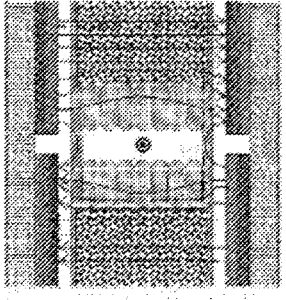 | 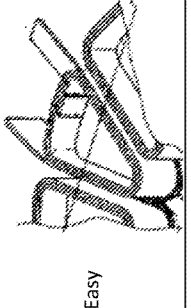 |
| Workability of winding | Easy | Difficult) Plastic deformation + Distortion removal annealing | 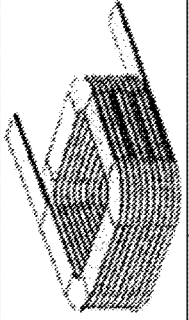 Easy |  Easy |
| Space factor | Slightly small (gap between wire turns) | Moderate | Slightly small (flange portion) | Maximum |
| Copper loss proportional to 1 by space factor | Moderate | | Slightly large | Minimum |
| Eddy loss | Small | Large | Minimum (Shielding by flange) | Small |
| Cooling performance near core | poor (≥150°C) | Good (+145°C) | | Significantly poor |

*The value inside the parentheses: temperature rise (in innermost layer) by thermal analysis modeling

OUTER ROTOR-TYPE AXIAL GAP BRUSHLESS MOTOR

TECHNICAL FIELD

The present invention relates to an axial gap brushless motor, and more particularly to an outer rotor-type axial gap brushless motor.

BACKGROUND ART

Motors (electric motors) that convert electrical energy into mechanical energy, which are used in various applications, typically include a rotor with a shaft that rotates about the shaft and a stator that is stationary relative to the rotor to magnetically interact with the rotor, and rotate the rotor by magnetic field (rotating magnetic field) that rotates and changes. Such motors are roughly classified, in view of the structure, into two motors, namely, a radial gap brushless motor (hereinafter abbreviated as "RG motor" where appropriate) and an axial gap brushless motor (hereinafter abbreviated as "AG motor" where appropriate). RG motors have a structure in which the stator and the rotor are spaced in the radial direction, and AG motors have a structure in which the stator and the rotor are spaced in the axial direction. AG motors, which have an advantage over RG motors in obtaining a larger torque with a small diameter, show promise, for example, for uses in vehicles.

Such AG motors are roughly classified into two types, namely, one with inner-rotor design (hereinafter abbreviated as "IR type" where appropriate) and one with outer-rotor design (hereinafter abbreviated as "OR type" where appropriate). The IR type AG motor has a structure in which coils are disposed at the stator and magnets are disposed at the rotor, and the rotor is disposed inside the stator. The OR type AG motor has a structure in which coils are disposed at the stator and magnets are disposed at the rotor, and the rotor is disposed outside the stator (for example, refer to Patent Literature 1). Characteristic differences between the IR type and the OR type lie in that the IR type has two times the number of coils that the OR type has whereas the OR type has two times the number of magnets that the IR type has. Although both of the IR type and OR type include a back yoke of a magnetic material outside the stator, the back yoke in the IR type functions as a return yoke in part of the magnetic circuit. Accordingly, the back yoke in the IR type is subjected to an AC magnetic field by the coils. To reduce resultant core loss, the back yoke in the IR type needs using a magnetic material that hardly allows eddy currents to flow therethrough, or for example, a laminated steel plate or compacted iron powder body. In contrast, the back yoke in the OR type, which is basically subjected to a DC magnetic field, only needs achieving magnetic shielding, and thus, pure iron based bulk iron material is good enough for the back yoke in the OR type. Accordingly the OR type AG motor, which includes a relatively small number of coils as assembly parts and does not need a relatively expensive magnetic material, are deemed advantageous in industrial applications compare with the IR type AG motor.

In addition, motors in general are required to be more compact and more powerful, or to have a high torque density. To achieve a higher torque density, driving a motor with a high magnetomotive force by passing a large current in the coils is required. In this motor driving at high magnetomotive force, the large current increases heat in the coils by copper loss or heat in the magnetic material by core loss. Accordingly to achieve a higher torque density, an efficient heat dissipation in the motor is required. The OR type AG motor allows for little space between the stator and the rotor to achieve an efficient magnetic effect between the stator and the rotor. Thus heat produced in the coils can hardly be released in the axial direction. Thus, the OR type AG motor has a structural disadvantage in view of heat dissipation.

A technique for heat dissipation in such an OR type AG motor is disclosed in, for example, Patent Literature 2. In the OR type AG motor disclosed in Patent Literature 2, a stator includes a housing that houses coils and their cores and a pump that feeds coolant by pressure into the housing to provide cooling for the coils and cores by means of the coolant that flows through the housing.

Meanwhile, although the OR type AG motor disclosed in Patent Literature 2 improves the heat dissipation by forced cooling by means of a coolant, the coolant come in contact with an outer peripheral surface alone of the coils. Coils in general are formed by winding a longitudinal conductor with insulation coating. Thus heat within the coil is conducted to the outer peripheral surface of the coil through insulation coating layers having poor thermoconductivity that are present between turns of the conductor. In this light, the OR type AG motor disclosed in Patent Literature 2 cannot be said as offering a preferable heat dissipation (cooling efficiency) for heat within the coil.

In addition, the OR type AG motor disclosed in Patent Literature 2 needs space for forming a flow path of the coolant between coils adjoining to each other in the circumferential direction, resulting in a decrease in the coil space factor in the circumferential direction. Thus, this motor would have a smaller number of coils among motors with the same size diameter, or would increase its size among motors with the same number of coils.

CITATION LIST

Patent Literature

Patent Literature 1: Japanese Patent No. 5128538 (Japanese Unexamined Patent Publication No. 2010-246171)
Patent Literature 2: US 2011/0309694 A1

SUMMARY OF INVENTION

The present invention has been made in view of the circumstances above, and an object thereof is to provide an outer rotor axial gap brushless motor capable of preventing decreases in the coil space factor in the circumferential direction while further improving heat dissipation.

In an outer rotor-type axial gap brushless motor according to the present invention, each of the plurality of coils included in a stator is constituted by winding a band-shaped conductor member via an insulating member such that the width direction of the conductor member runs along the axial direction of the coil, and has a through passage which penetrates in the axial direction of the coil and which is included between prescribed turns in a portion of the coil that corresponds to an outer side in a radial direction of the stator relative to a core portion of the coil. Thus, the outer rotor axial gap brushless motor thus configured prevents decreases in the coil space factor in the circumferential direction while further improving heat dissipation.

The above described and other aims, features, and advantages of the present invention will be clarified with subsequent description and attached figures.

BRIEF DESCRIPTION OF DRAWINGS

FIG. 5 is views for illustrating the configuration of a stator module in an OR type AG motor according to a second embodiment.

FIG. 7 is a sectional view showing a part of a stator in the OR type AG motor according to the second embodiment.

FIG. 8 is views for illustrating the configuration of an OR type AG motor according to a third embodiment.

FIG. 13 illustrates wire types of the conductor member, how the wire is wound, and its characteristics.

DESCRIPTION OF EMBODIMENTS

Now one embodiment according to the present invention will be described with reference to the figures. It is noted that features with an identical reference sign added in the figures indicate an identical feature, and description for identical features will be omitted where appropriate. In the present description, a reference sign without an added sign indicates a general feature, and a reference sign with an added sign indicates an individual feature.

First Embodiment

Figure 1:
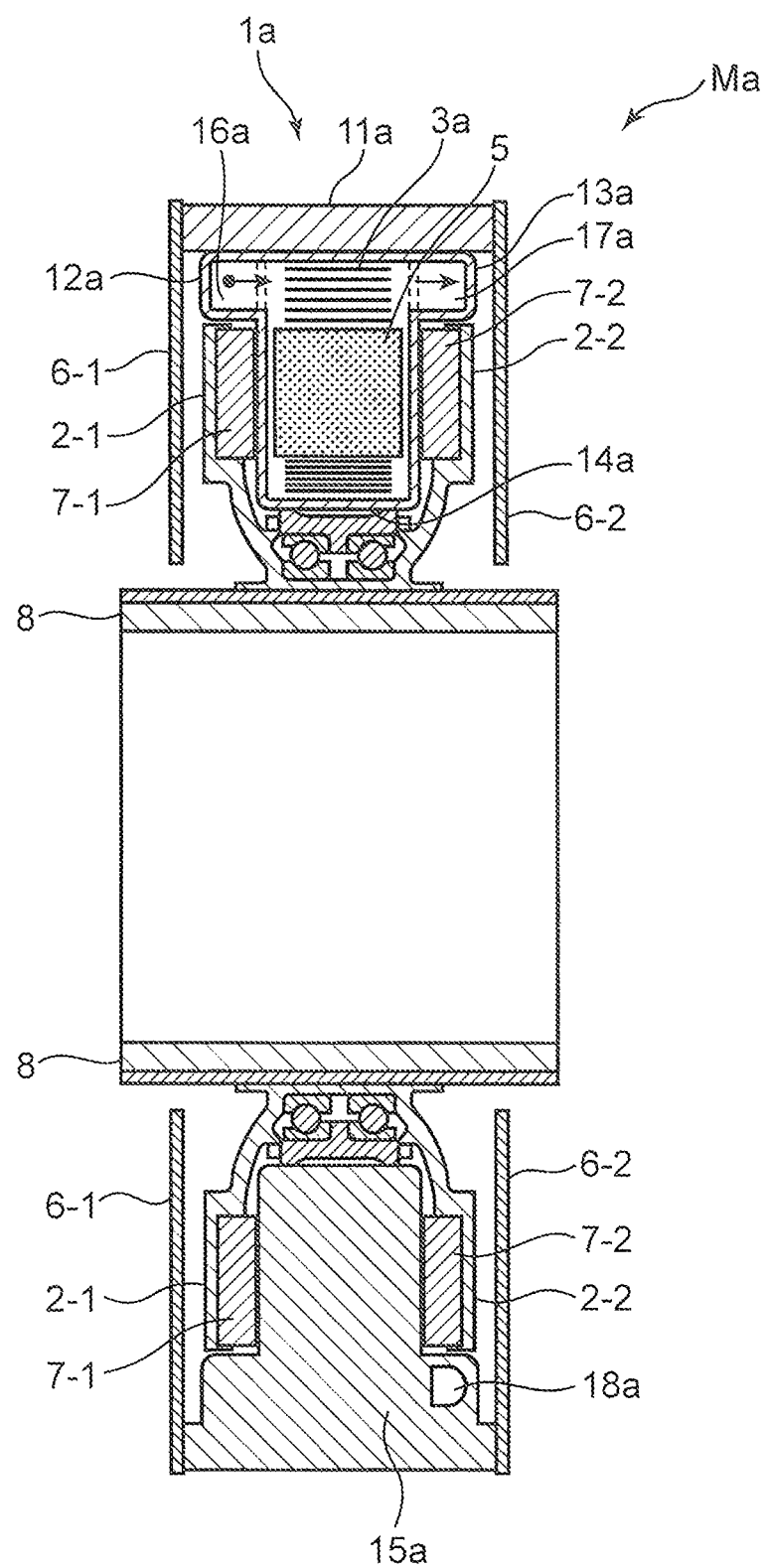
FIG. 1 is a sectional view showing the configuration of an outer rotor-type axial gap brushless motor (OR type AG motor) in an embodiment.

FIG. 1 is a sectional view showing the configuration of an outer rotor-type axial gap brushless motor (OR type AG motor) in an embodiment. FIG. 1 is a sectional view taken along the cross-section line ACB shown in FIG. 2A. Although FIG. 1 is a sectional view of an OR type AG motor Ma in a first embodiment, OR type AG motors Mb to Mf in second to sixth embodiments (described later), while being provided with respective stators 1b to 1f different from a stator 1a of the OR type AG motor Ma in the first embodiment, include other features, such as rotors 2-1 and 2-2, that are similar to those of the OR type AG motor Ma in the first embodiment. In this light, FIG. 1 can be a sectional view of each of the OR type AG motors Mb to Mf in the second to sixth embodiments.

Figure 2B:
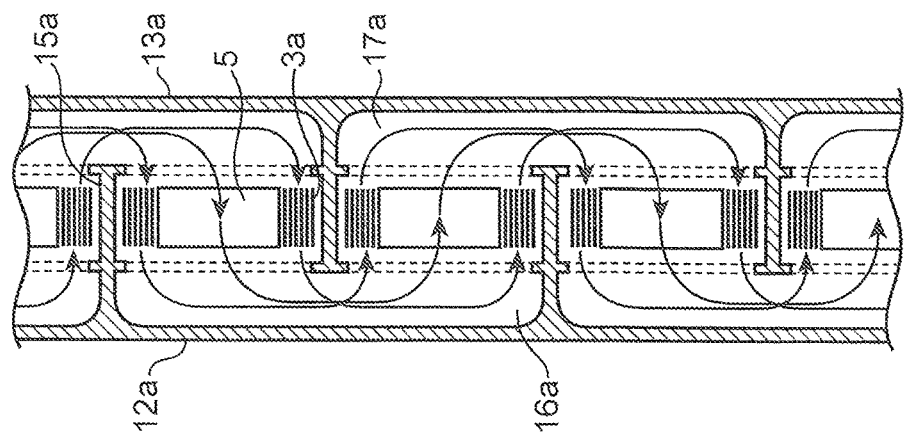
FIG. 2 is a view for illustrating the configuration of a stator in an OR type AG motor according to a first embodiment.
Figure 2A:
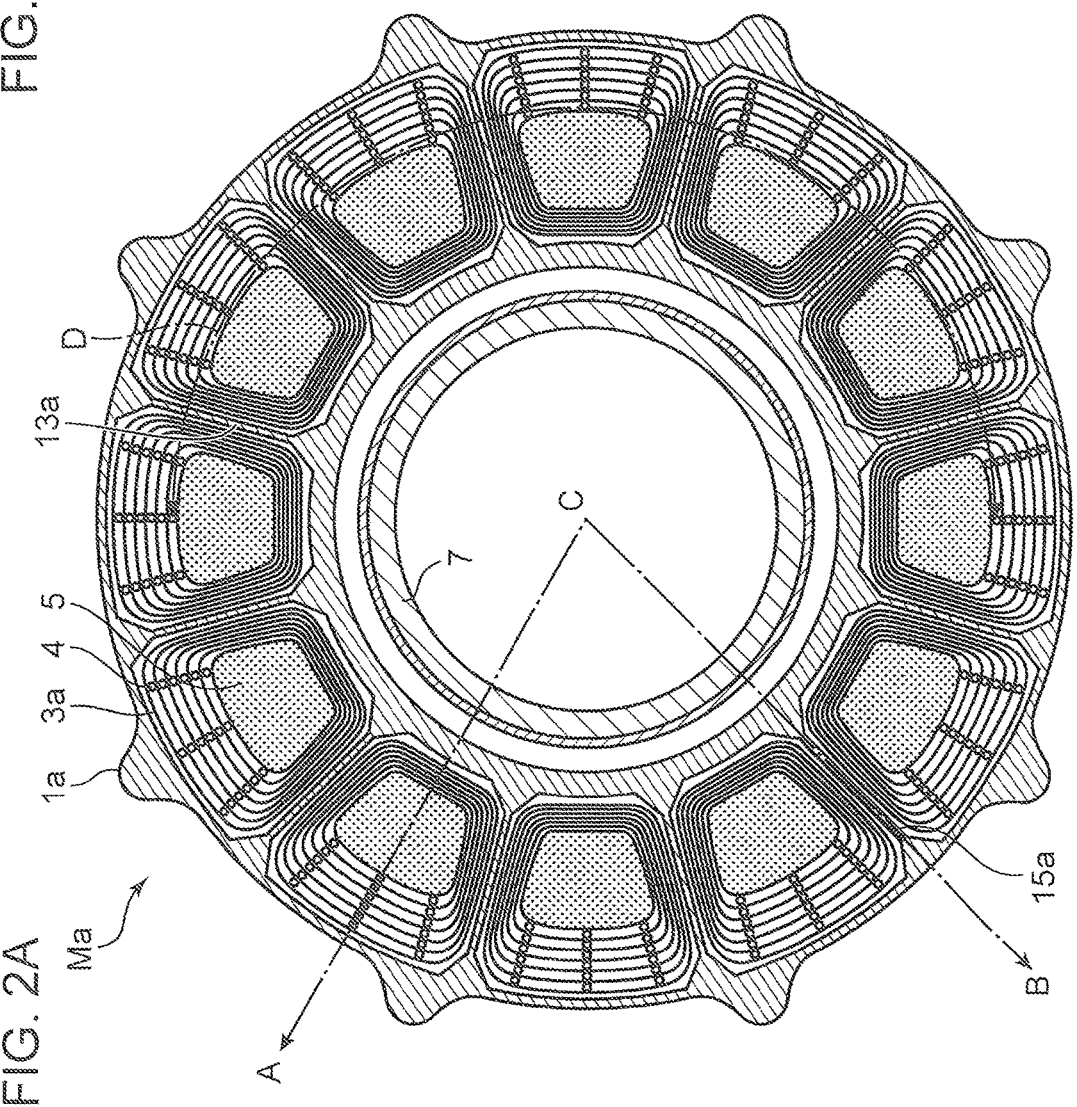
Figure 3:
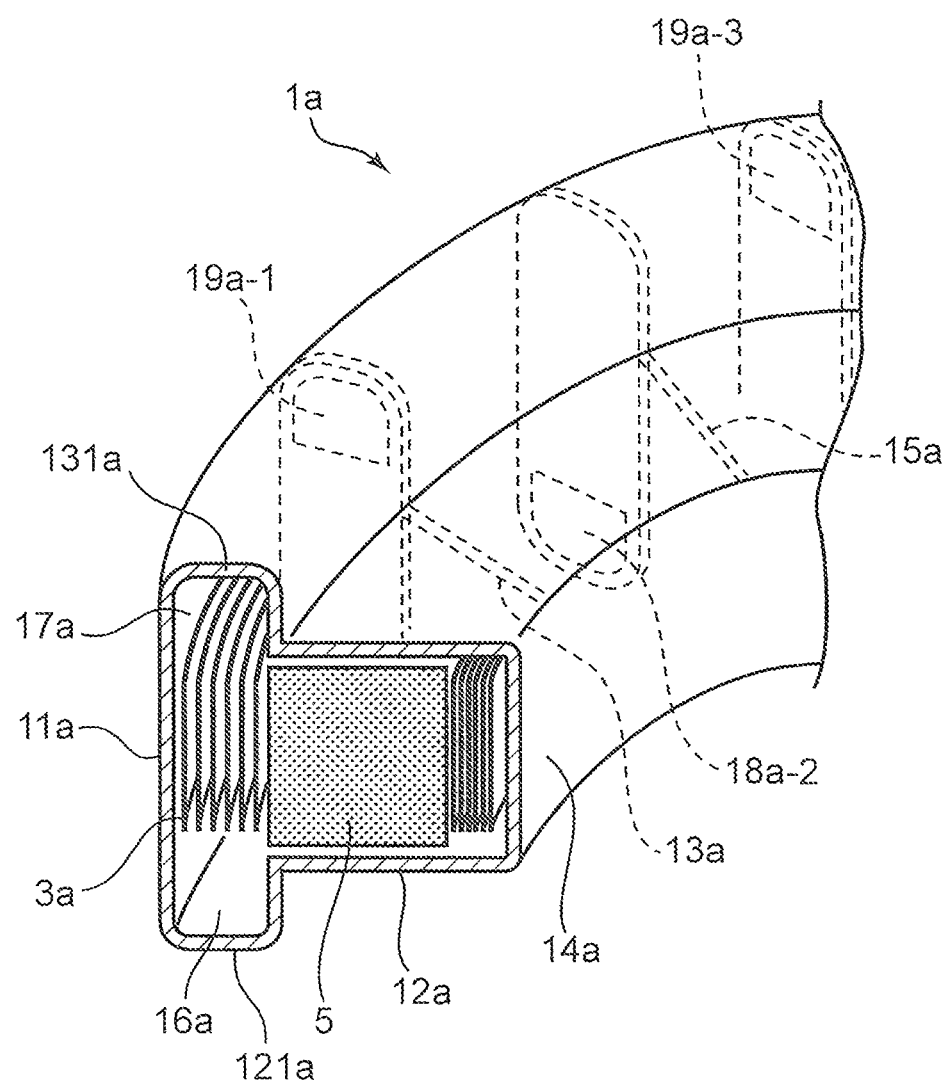
FIG. 3 is a partial, perspective, sectional view showing a part of the stator in the OR type AG motor according to the first embodiment.
Figure 4:
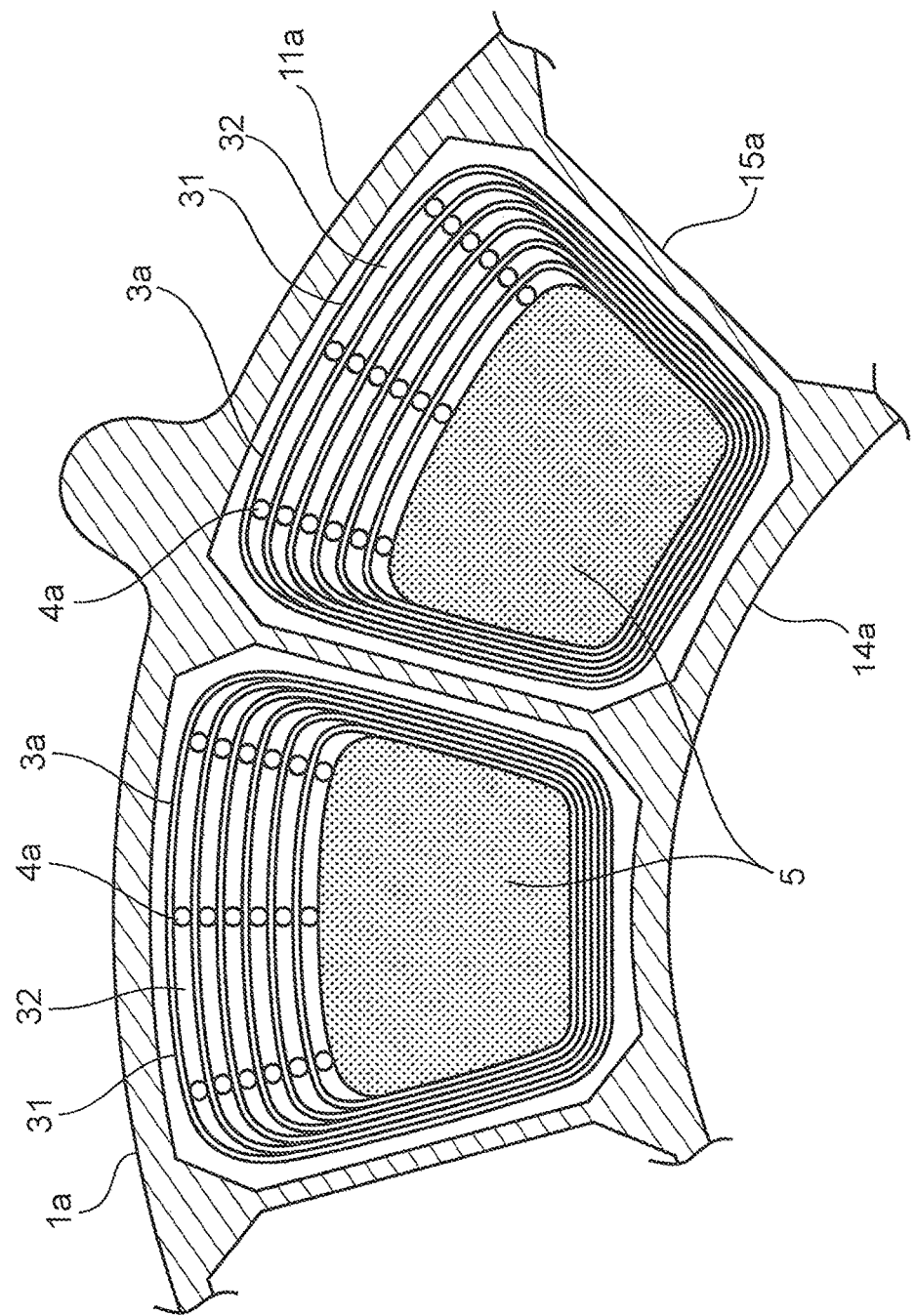
FIG. 4 is an enlarged, sectional view showing coils and their surroundings in the stator in the OR type AG motor according to the first embodiment.

FIG. 2 is a view for illustrating the configuration of a stator in the OR type AG motor according to the first embodiment. FIG. 2A is a partial, top, sectional view, and FIG. 2B is a sectional view taken along the cross-section line D shown in FIG. 2A. FIG. 3 is a partial, perspective, sectional view showing a part of the stator in the OR type AG motor according to the first embodiment. FIG. 4 is an enlarged, sectional view showing coils and their surroundings in the stator in the OR type AG motor according to the first embodiment.

The outer rotor-type axial gap brushless motor (OR type AG motor) Ma in the first embodiment includes the stator 1a, a pair of rotors 2 (2-1, 2-2), as shown in FIG. 1 to FIG. 4.

The stator 1a is a non-rotating part, and includes a plurality of coils 3a disposed in the circumferential direction. The stator 1a is joined and fixed to a pair of annular plate-like shaped supporting members 6-1 and 6-2 outside the rotors 2-1 and 2-2 each disposed therebetween, and is supported by them. Details of the stator 1a will be described later.

The rotor 2 is composed of the pair of first and second rotors 2-1 and 2-2. The pair of first and second rotors 2-1 and 2-2 are respectively disposed on both sides of the stator 1a with a prescribed distance therebetween in the rotation axis direction so as to have a common rotation axis. The first rotor 2-1 includes a plurality of magnets (e.g. permanent magnets) 7-1 disposed inside so as to face coils 3a of the stator 1a, and in the circumferential direction. The plurality of magnets 7-1 are disposed in a manner such that different magnetic poles are disposed alternately, as SNSN . . . , etc., between the magnets 7-1 adjoining to each other in the circumferential direction. In other words, the plurality of magnets 7-1 are disposed so as to point, in the same direction, the magnetic field of every other magnet in the circumferential direction. The second rotor 2-2 includes a plurality of magnets (e.g. permanent magnets) 7-2 disposed inside so as to face the coils 3a of the stator 1a, and in the circumferential direction. The plurality of magnets 7-2 are also disposed in a manner such that different magnetic poles are disposed alternately between the magnets 7-2 adjoining to each other in the circumferential direction, as in the plurality of magnets 7-1. These first and second rotors 2-1 and 2-2, which have an identical shape, are annular, plate-like members that are roughly substantially flat along a direction orthogonal to the rotation axis direction. The pluralities of magnets 7-1 and 7-2 are provided on respective flat portions along the orthogonal direction in the first and second rotors 2-1 and 2-2. The annular plate-like members of the first and second rotors 2-1 and 2-2 have inner peripheral portions gradually bending as approaching the rotation axis direction, and their innermost peripheral portions are flat along the rotation axis direction. Ends of the flat portions along the rotation axis direction in the annular plate-like members of the first and second rotors 2-1 and 2-2 are joined to each other and these flat portions are brought into contact, via a bearing, with an outer peripheral side surface of a rotating shaft body 8 of a cylindrical or columnar shape.

It is noted that any number of coils 3a and any number of magnets 7-1 and 7-2 can be used. For example, the number of coils 3a may be eight and the number of each of the magnets 7-1 and 7-2 may be twelve (12 slot 8 pole), for example, the number of coils 3a may be twelve and the number of each of the magnets 7-1 and 7-2 may be ten (12 slot 10 pole), for example, the number of coils 3a may be twelve and the number of each of the magnets 7-1 and 7-2 may be sixteen (12 slot 16 pole), or for example, the number of coils 3a may be nine and the number of each of the magnets 7-1 and 7-2 may be eight (9 slots for 8 poles). As in these examples, various modes are possible.

The stator 1a will be further described in detail. The stator 1a includes a stator outer peripheral portion 11a, a stator bottom portion 12a, a stator top portion 13a, a stator inner peripheral portion 14a, and stator partition wall portions 15a, in order to house the plurality of coils.

The stator outer peripheral portion 11a is a cylindrical (hollow column) member that forms an outer peripheral side wall of the stator 1a. The stator bottom portion 12a is a roughly substantially annular plate-like member that forms a lower wall (bottom wall) of the stator 1a and lower coolant passage portions 16a. An outer peripheral side portion in the annular plate-like member of this stator bottom portion 12a protrudes outward in the axial direction over the entire periphery to form a lower annular protrusion portion 121a. Internal space of this lower annular protrusion portion 121a serves as the lower coolant passage portions 16a. The lower coolant passage portions 16a are space for flowing a coolant through a through passage 32 described later. The stator top portion 13a is a roughly substantially annular plate-like member that forms an upper wall (top wall) of the stator 1a and an upper coolant passage portion 17a. An outer peripheral side portion in the annular plate-like member of this stator top portion 13a protrudes outward in the axial direction over the entire periphery to form an upper annular protrusion portion 131a. Internal space of this upper annular protrusion portion 131a serves as the upper coolant passage portions 17a. The upper coolant passage portions 17a are space for flowing a coolant through the through passage 32. The stator inner peripheral portion 14a, which is a cylindrical (hollow columnar) member that forms an inner peripheral side wall of the stator 1a, has a diameter smaller than the stator outer peripheral portion 11a.

The stator bottom portion 12a and the stator top portion 13a are spaced apart from each other by a prescribed distance so as to face each other in the rotation axis direction. An inner peripheral end of the stator bottom portion 12a is joined to one end (lower end) of the stator inner peripheral portion 14a, and an outer peripheral end (an end of the lower annular protrusion portion 121a) of the stator bottom portion 12a is joined to one end (lower end) of the stator outer peripheral portion 11a. An inner peripheral end of the stator top portion 13a is joined to the other end (upper end) of the stator inner peripheral portion 14a, and an outer peripheral end (an end of the upper annular protrusion portion 131a) of the stator top portion 13a is joined to the other end (upper end) of the stator outer peripheral portion 11a. The stator outer peripheral portion 11a, the stator bottom portion 12a, the stator top portion 13a, and the stator inner peripheral portion 14a, which are thus joined to one another, form an internal space, and the internal space forms accommodation space that houses the plurality of coils 3a with cores. The stator partition wall portions 15a are a plurality of plate-like members that forms inner walls (partition walls) of the stator 1a that partition the internal space into a plurality of accommodation spaces (slots) to house the plurality of coils 3a respectively. The plurality of stator partition wall portions 15a are provided in the internal space along the radial direction while being spaced evenly from each other in the circumferential direction. Thus, the shape of each of the stator partition wall portions 15a as seen from the circumferential direction is equivalent to a cross-sectional shape (the shape as seen from the circumferential direction) of the internal space taken along a cross-section line in the radial direction.

In the plurality of stator partition wall portions 15a, supply discharge ports 18a are formed therethrough at positions (lower positions) corresponding to positions for forming the lower coolant passage portions 16a to allow every other lower coolant passage portions 16a in the accommodation spaces (slots) adjacent in the circumferential direction to communicate with each other. Similarly, in the plurality of stator partition wall portions 15a where the supply discharge ports 18a are not formed, at positions corresponding to positions for forming the lower coolant passage portions 16a, supply discharge ports 19a are formed therethrough at positions (upper positions) corresponding to positions for forming the upper coolant passage portions 17a to allow every other upper coolant passage portions 17a in the accommodation spaces (slots) adjacent in the circumferential direction to communicate with each other. These supply discharge ports 18a and 19a are, for one accommodation space (first accommodation space), a supply port that supplies coolant from an accommodation space (second accommodation space) adjacent in the circumferential direction, and for the second accommodation space adjacent in the circumferential direction, a discharge port that discharges coolant to the first accommodation space. Accordingly a pair of supply port and discharge port in the first accommodation space is provided such that one of the pair is disposed at a first rotor side of the stator 1a that faces the first rotor 2-1 and the other of the pair is disposed at a second rotor side of the stator 1a that faces the second rotor 2-2. Portions where the supply discharge ports 18a and 19a are formed in the stator partition wall portions 15a are an example of the communicating joint portion between the coils 3a adjoining to each other in circumferential direction among the plurality of coils 3a, the communicating joint portion joining, in a communicable manner, a discharge port corresponding to one coil 3a to a supply port corresponding to a coil 3a adjoining to the one coil 3a at one side in the circumferential direction.

In the lower coolant passage portions 16a, an external supply port, not shown, is formed to supply coolant from outside, and in the upper coolant passage portions 17a, an external discharge port, not shown, is formed to discharge coolant to outside.

The stator outer peripheral portion 11a, the stator bottom portion 12a, the stator top portion 13a, the stator inner peripheral portion 14a, and the plurality of stator partition wall portions 15a that constitute the stator 1a are formed of, for example, a laminate of plates composed of magnetic materials including soft magnetic materials such as iron or steel, a compacted powder body composed of powder of the magnetic materials or the powder with insulation coating formed on its surface, or combined materials of the laminate and the compacted powder body. The stator outer peripheral portion 11a, the stator bottom portion 12a, the stator top portion 13a, the stator inner peripheral portion 14a, and the plurality of stator partition wall portions 15a may be, for example, formed separately, and then joined and fixed with, for example, an adhesive. Alternatively, for example, part of the stator outer peripheral portion 11a, the stator bottom portion 12a, the stator top portion 13a, the stator inner peripheral portion 14a, and the plurality of stator partition wall portions 15a may be formed integrally. Alternatively, the stator 1a may be divided into two, upper and lower members and formed of the two members. Alternatively, cores of the coils 3a may be formed integrally with the stator bottom portion 12a or the stator top portion 13a.

As shown in FIG. 4, each of the plurality of coils 3a is constituted by winding a band-shaped conductor member 31 via an insulating member such that the width direction of the conductor member 31 runs along the axial direction of the coil 3a, and has a through passage 32 penetrating in the axial direction of the coil 3a, the through passage 32 being included between prescribed turns in a portion of the coil 3a that corresponds to the outer side in the radial direction of the stator 1a relative to a core portion of the coil 3a. That is to say, each of the plurality of coils 3a includes the longitudinal band-shaped conductor member 31 having a longer width in the axial direction of the coil than the thickness in the radial direction of the coil and insulating member disposed between turns of the conductor member 31, the conductor member being wound with the start from an inner peripheral side and the end at an outer peripheral side, and in this regard, being wound so as to leave prescribed clearance in the radial direction in the portion of the coil 3a that corresponds to the outer side in the radial direction of the stator 1a relative to the core portion of the coil 3a.

In one coil 3a, a single through passage 32 may be provided, or alternatively a plurality of through passages 32 may be provided. The through passage 32 may be provided every turn, alternatively every several turns, or alternatively every random number of turns. In the example shown in FIG. 4, through passages 32 are provided every turn. Within the through passages 32 in the present embodiment, shape maintaining members (spacers) 4a are provided for maintaining the shape of the through passages 32. More specifically, three shape maintaining members 4a are spaced a prescribed distance apart from one another in the circumferential direction in one through passage 32. In more detail, the three shape maintaining members 4a are disposed at a substantially central position and at both end positions in the circumferential direction. The shape maintaining members 4a are columnar members. These shape maintaining members 4a are formed of a nonmagnetic material.

The band-shaped conductor member 31 may be composed, for example, of a superconductive material, or alternatively for example, a metal material having a relatively low resistance and a relatively high thermal conductivity, such as pure copper (Cu) and aluminum (Al).

The plurality of coils 3a are each a cored coil having a core 5 formed of a magnetic substance at the core portion.

The plurality of cored coils 3a are housed in the accommodation spaces (slots) partitioned by the plurality of stator partition wall portions 15a, as described, so as to dispose, between the lower coolant passage portion 16a and the upper coolant passage portion 17a, the portion of the coil 3a in which the through passages 32 are formed and which corresponds to the outer side in the radial direction of the stator 1a relative to the core portion of the coil 3a.

Meanwhile, in portions except the portion of the coil 3a, where the through passages 32 are formed, that corresponds to the outer side in the radial direction of the stator 1a relative to the core portion of the coil 3a, or for example, in portions of the coil 3a that corresponds to both sides in the circumferential direction of the stator 1a relative to the core portion of the coil 3a, the conductor member 31 is wound so as to come in close contact via insulating material. Then, the plurality of coils 3a are respectively housed in the accommodation spaces (slots) partitioned by the plurality of stator partition wall portions 15a so as to come in close contact with the stator partition wall portions 15a.

The OR type AG motor Ma, during operation, is supplied with a prescribed coolant through the external supply port, not shown, from a heat exchanger, not shown. As the prescribed coolant, for example, in a liquid phase, pure water with an antifreeze agent added, nonpolar insulating oil, a fluorocarbon or nonfluorocarbon organic solvent, liquid nitrogen, and liquid natural gas can be used. Alternatively, for example, in a gas phase, an inert gas, hydrogen, helium, nitrogen, argon, and fluorocarbon or nonfluorocarbon gas can be used. In this regard, in a case where the coolant is liquid natural gas of about −170° C. or liquid nitrogen or its vaporize gas of about −200° C., the resistivity of copper used for the conductor member 31 can be decreased up to $\frac{1}{7}$ to $\frac{1}{8}$ relative to the resistivity in the room temperature. This enables special applications such as the use in, for example, a LNG tanker driven by a remarkably large current.

A coolant supplied from the external supply port flows from the lower coolant passage portion 16a in an accommodation space (slot, accommodation space A) that communicates with the external supply port, though the through passage 32 of the coil 3a housed in the accommodation space A, and to the upper coolant passage portion 17a in the accommodation space A. The coolant, when flowing through the through passage 32 of this coil 3a, draws heat from the conductor member 31 of the coil 3a to provide cooling for the coil 3a. The coolant that has flowed into the upper coolant passage portion 17a is discharged from the supply discharge port 19a disposed at a position that corresponds to that upper coolant passage portion 17a, and is supplied to the upper coolant passage portion 17a in an accommodation space (accommodation space B) adjoining to the accommodation space A at one side in the circumferential direction.

The coolant that has been supplied to the upper coolant passage portion 17a in the accommodation space B flows from the upper coolant passage portion 17a, through the through passage 32 of the coil 3a housed in the accommodation space B, and to the lower coolant passage portion 16a in the accommodation space B. The coolant, when flowing through the through passage 32 of this coil 3a, draws heat from the conductor member 31 of the coil 3a to provide cooling for the coil 3a. The coolant that has flowed into the lower coolant passage portion 16a is discharged from the supply discharge port 18a disposed at a position that corresponds to that lower coolant passage portion 16a, and is supplied to a lower coolant passage portion 16a in an accommodation space (accommodation space C) adjoining to the accommodation space B at one side in the circumferential direction.

The coolant that has been supplied to the lower coolant passage portion 16a in the accommodation space C similarly flows from the lower coolant passage portion 16a, through the through passage 32 of the coil 3a housed in the accommodation space C, and to the upper coolant passage portion 17a in the accommodation space C. The coolant, when flowing through the through passage 32 of this coil 3a, draws heat from the conductor member 31 of the coil 3a to provide cooling for the coil 3a. The coolant that has flowed into the upper coolant passage portion 17a is discharged from the supply discharge port 19a disposed at a position that corresponds to that upper coolant passage portion 17a, and is supplied to an upper coolant passage portion 17a in an accommodation space (accommodation space D) adjoining to the accommodation space C at one side in the circumferential direction.

The coolant that has been supplied to the upper coolant passage portion 17a in the accommodation space D similarly flows from the upper coolant passage portion 17a, through the through passage 32 of the coil 3a housed in the accommodation space D, and to the lower coolant passage portion 16a in the accommodation space D. The coolant, when flowing through the through passage 32 of this coil 3a, draws heat from the conductor member 31 of the coil 3a to provide cooling for the coil 3a. The coolant that has flowed into the lower coolant passage portion 16a is discharged from the supply discharge port 18*a* disposed at a position that corresponds to that lower coolant passage portion 16*a*, and is supplied to a lower coolant passage portion 16*a* in an accommodation space (accommodation space E) adjoining to the accommodation space D at one side in the circumferential direction.

Subsequently, the coolant similarly flows through the accommodation spaces in turn toward one side in the circumferential direction, and in each accommodation space, flows through the lower coolant passage portion 16*a* (the upper coolant passage portion 17*a*), the through passage 32, and the upper coolant passage portion 17*a* (the lower coolant passage portion 16*a*). The coolant thus provides cooling for the coils 3*a* housed in the accommodation spaces (slots) in turn, and is supplied to the upper coolant passage portion 17*a* in an accommodation space (accommodation space L) adjoining to the accommodation space A at the other side in the circumferential direction. The coolant that has been supplied to the upper coolant passage portion 17*a* in the accommodation space L flows from this upper coolant passage portion 17*a*, through the through passage 32 of the coil 3*a* housed in the accommodation space L, and to the lower coolant passage portion 16*a* in the accommodation space L. The coolant, when flowing through the through passage 32 of this coil 3*a*, draws heat from the conductor member 31 of the coil 3*a* to provide cooling for the coil 3*a*. The coolant that has flowed into the lower coolant passage portion 16*a* is discharged from the external discharge port (not shown) communicating with the lower coolant passage portion 16*a*, to return to the heat exchanger.

As described, the OR type AG motor Ma in the present embodiment has, in each of the plurality of coils 3*a*, the through passage 32 penetrating in the axial direction of the coil 3*a*, the through passage 32 being included between prescribed turns in the portion (outer portion in the radial direction, coil end portion) of the coil 3*a* that corresponds to the outer side in the radial direction of the stator 1*a* relative to the core portion of the coil 3*a*. Thus, the through passage 32 thus configured allows a portion (contact portion) of the band-shaped conductor member 31 that is in contact with the through passage 32 to have the function of dissipating heat and to be used as a dissipation plate. In the present embodiment, a coolant, which flows through the through passage 32, draws heat of the conductor member 31 through the contact portion, achieving an effective cooling of the coil 3*a*. The conductor member 31, which is typically also a thermal conductor excellent in thermal conductivity, conducts heat in a part of the coil 3*a* (remaining part) that remains except the contact portion, to the contact portion to dissipate heat with the contact portion. In particular, although heat in a portion of the coil 3*a* (inner portion in the radial direction) that corresponds to the inner side in the radial direction of the stator 1*a* relative to the core portion of the coil 3*a* is typically difficult to dissipate, the OR type AG motor Ma in the present embodiment suitably allows heat in the inner portion in the radial direction to be conducted to the contact portion by means of the band-shaped conductor member 31 to dissipate heat through the contact portion. Thus, the contact portion can have the function of dissipating heat, and thus the OR type AG motor Ma does not need space for forming a flow path of coolant between coils adjoining to each other in the circumferential direction, unlike the OR type AG motor disclosed in Patent Literature 2. Thus, the OR type AG motor Ma in the present embodiment allows the space between coils in the circumferential direction to decrease, thus preventing decrease in the coil space factor.

The OR type AG motor Ma in the present embodiment, which includes the lower coolant passage portion 16*a* and the upper coolant passage portion 17*a*, enables forced cooling by the flowing of coolant, achieving an efficient cooling. Thus, the OR type AG motor Ma in the present embodiment allows the passage of a large current, achieving a high torque density.

In the OR type AG motor Ma in the present embodiment, the through passage 32 is formed by, in winding the conductor member 31, making winding while leaving a prescribed clearance in the radial direction in the portion of the coil 3*a* that corresponds to the outer side in the radial direction of the stator 1*a* relative to the core portion of the coil 3*a*. The through passage 32 has a longer length in the circumferential direction of the coil 3*a* than that in the radial direction of the coil 3*a*. Thus, in the OR type AG motor Ma in the present embodiment, the band-shaped conductor member 31 come in contact with the through passage 32 at a larger area to dissipate a larger amount of heat.

Now, there will be described wire types of the conductor member of coils, how to wind it, and its characteristics with reference to FIG. 13.

In an OR type AG motor I of a first mode, the conductor member of coil is a thin, linear conductor of a round shape in sectional view. As the cooling method, bringing a coolant into contact with an outer peripheral surface of the coil is done. It is noted that the second row from the top of FIG. 13 shows the cross-section of part of two coils adjoining to each other with magnetic lines of force schematically indicated by a solid line with arrow.

In an OR type AG motor II of a second mode, the conductor member of coil is a strip conductor, and is wound by what is called edgewise winding. As the cooling method, bringing a coolant into contact with an outer peripheral surface of the coil is done.

In an OR type AG motor III of a third mode, the coil differs from that in the OR type AG motor II of the second mode in additionally providing flanges that covers upper and lower surfaces of the coil.

In an OR type AG motor IV of a fourth mode, the conductor member of coil is a strip conductor, and is wound by what is called flatwise winding. As the cooling method, bringing a coolant into contact with an outer peripheral surface of the coil is done. It is noted that the OR type AG motor IV of the fourth mode is not provided with the through passage 32 as in the OR type AG motor Ma according to the present embodiment.

As for winding workability in winding the conductor member, among the OR type AG motors I to IV of the first to fourth modes, the OR type AG motors II and III of the second and third modes use edgewise winding, which requires plastic deformation of the band-shaped conductor member and further requires annealing of it to remove its distortion. Winding workability in the OR type AG motors II and III of the second and third modes are more difficult than that in the OR type AG motors I and IV of the first and fourth modes. As for the coil space factor, the coil in the OR type AG motor I in the first mode forms a gaps between wires of the coil; the coil in the OR type AG motor II of the second mode forms a gap at corners of the coil; and the coil in the OR type AG motor III of the third mode forms a gap at corners of the coil and in addition, needs volume for the flanges. Accordingly, the coil space factor becomes larger in the order of the OR type AG motors I, III, II, and IV of the first, third, second, fourth modes. As for the copper loss, which is proportional to the reciprocal of the coil space factor, the copper loss becomes smaller in the order of the OR type AG motors I, III, II, and IV of the first, third, second, and fourth modes. As for the eddy current loss, in light of the size of area that allows the formation of an eddy current and the shielding of magnetic fields at the flanges, the eddy current loss in the OR type AG motor II of the second mode is the largest and the eddy current loss in the OR type AG motor III of the third mode is the smallest. Each eddy current loss in the OR type AG motor I and IV of the first and fourth modes is between the former two.

Considering the workability of winding, the coil space factor, the copper loss, and the eddy current loss comprehensively, the OR type AG motor IV of the fourth mode has an advantage over the others, or the OR type AG motors I to III of the first to third modes.

However, as for cooling effects, in adopting a forced cooling method including immersing an entire slot configured of the core and coil in a coolant and flowing the coolant therein, the coolant in the OR type AG motors I to IV of the first to fourth modes comes in contact with the outer surface alone of the coil. Thus, heat produced in the interior of the coil (at the inner peripheral side) is conducted through the coil, reaches the outer surface of the coil, and is then released. In the OR type AG motors II and III of the second and third modes, where an edgewise-wound coil is used, heat produced in the interior of the coil (at the inner peripheral side) is conducted to the outer surface of the coil through the conductor member of the coil. In contrast, heat produced in the interior of the coil (at the inner peripheral side) in the OR type AG motors I and IV of the first and fourth modes, which is conducted through insulating material with a small heat conductivity, the insulating material being present between each turn, and reaches the outer surface of the coil, has difficulty in reaching the outer surface of the coil. Accordingly, as for the cooling, the OR type AG motors II and III of the second and third modes excellent, and, the OR type AG motors I and IV of the first and fourth modes are inferior. Thus, in view of the cooling, or in view of driving the motor with a high magnetomotive force by passing a large current through the coils, the OR type AG motor IV of the fourth modes, while being excellent in the other views, is not preferable.

In this regard, the OR type AG motor Ma according to the present embodiment solves the problem with the cooling by means of a relatively simple structure, or by including the through passage 32 penetrating in the axial direction of the coil 3a, the through passage 32 being included between prescribed turns in the portion of the coil 3a that corresponds to the outer side in the radial direction of the stator 1a relative to the core portion of the coil 3a. As an example, a numerical experiment (simulation) was made on temperature rises in the innermost turn by thermal analysis of simplified models. Analysis conditions are as follows: wiring dimension with a current density of 20 A/mm$^2$; calorific value 300 W; number of turns 30; the coolant temperature 30° C.; close winding with no gap between turns. In the analysis, thermal conductivity calculation was made on the conductivity between the cooling water and the insulation coating and between the insulation coating and the copper wire to find the temperature of the copper wire in each layer. The conductor temperature at the innermost turn, which rises most, was evaluated as the temperature rise received from an input coolant. Results are as follows: the conductor temperature at the innermost turn in the OR type AG motor I of the first mode is +150° C. or larger, and each conductor temperature at the innermost turn in the OR type AG motors II and III of the second and third modes is +145° C., whereas the conductor temperature at the innermost turn in the OR type AG motor Ma according to the present embodiment is +70° C. As seen, the OR type AG motor Ma according to the present embodiment enjoys the structure of the OR type AG motor IV of the fourth mode, which has an advantage as a whole in view of the winding workability, the coil space factor, the copper loss, and the eddy current loss, while exhibiting an excellent cooling effect by means of a relatively simple structure, or by including the through passage 32.

In addition, the plurality of coils 3a, which can be disposed closely in the circumferential direction, allows the OR type AG motor Ma in the present embodiment to prevent decrease in the coil space factor in the circumferential direction, even if a forced cooling method by means of a coolant is adopted.

As described, the OR type AG motor Ma according to the present embodiment have both of a high cooling efficiency and a high space factor.

In the OR type AG motor Ma according to the present embodiment, one (for example, the supply discharge port 18a) of the pair of supply discharge ports 18a and 19a is provided at a first rotor 2-1 side of the stator 1a and the other (in this example, the supply discharge port 19a) of the pair of supply discharge ports 18a and 19a is provided at the second rotor 2-2 side of the stator 1a. Accordingly, a coolant that has entered from the supply discharge port 18a or 19a (in this example, the supply discharge port 18a) flows through the lower coolant passage portion 16a and the upper coolant passage portion 17a along the axial direction. In consequence, the coolant flows in the band-shaped conductor member 31 along its width direction and exits from the supply discharge port 18a or 19a (in this example, the supply discharge port 19a). Thus, the OR type AG motor Ma in the present embodiment brings a coolant into contact with the band-shaped conductor member 31 across its entire width direction to effectively provide cooling for the band-shaped conductor member 31.

In the OR type AG motor Ma in the present embodiment, flow paths of coolant are combined into a single path, thus allowing the supply of a coolant with a single external supply port and the discharging of the coolant with a single external discharge port. This simplifies the piping for coolant disposed in surroundings of the OR type AG motor Ma in the present embodiment. Thus, this enables the OR type AG motor Ma in the present embodiment to become more compact.

The OR type AG motor Ma according to the present embodiment, which includes the shape maintaining member 4a, maintains the through passage 32 even when, for example, receiving an impact and thus maintains the cooling performance.

Next, another embodiment will be described.

Second Embodiment

Figure 6:
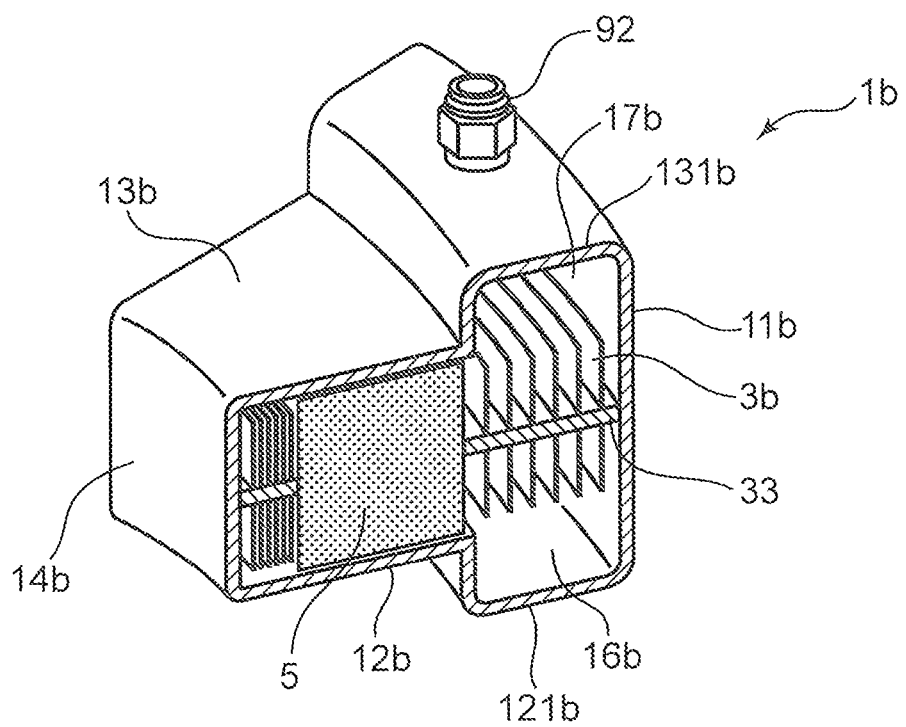
FIG. 6 is a partial, perspective, sectional view showing the stator module in the OR type AG motor according to the second embodiment.

FIG. 5 is views for illustrating the configuration of a stator module in an outer rotor-type OR type AG motor according to a second embodiment. FIG. 5A is a sectional view taken along a cross-section line parallel to the radial direction, FIG. 5B is a sectional view taken along a cross-section line parallel to the circumferential direction, and FIG. 5C is a view for illustrating the connection of an interposition member. FIG. 6 is a partial, perspective, sectional view showing the stator module in the OR type AG motor according to the second embodiment. FIG. 7 is a sectional view showing a part of a stator in the OR type AG motor according to the second embodiment. FIG. 7 shows three stator modules.

The OR type AG motor Ma in the first embodiment includes the stator 1a configured integrally, whereas an OR type AG motor Mb in the second embodiment includes a plurality of stator modules 1b that house the plurality of coils 3a respectively. A stator in the OR type AG motor Mb in the second embodiment is formed by disposing and fixing the plurality of stator modules 1b so as to position the plurality of coils 3a in turn in the circumferential direction.

The OR type AG motor Mb thus configured in the second embodiment includes the stator composed of the plurality of stator modules 1b and a pair of rotors 2-1 and 2-2. This pair of rotors 2-1 and 2-2 is similar to the pair of rotors 2-1 and 2-2 of the OR type AG motor Ma in the first embodiment, and thus description thereof is omitted.

The plurality of stator modules 1b in the OR type AG motor Mb in the second embodiment are formed roughly substantially by dividing the stator partition wall portions 15a into two at a cross-section of a cross-section line along the radial direction to divide the stator 1a in the OR type AG motor Ma in the first embodiment into each of the accommodation spaces (slots) that houses a single coil 3.

The plurality of stator modules 1b have an identical shape to one another, and thus one stator module 1b will be described specifically. As shown in FIG. 5 and FIG. 6, the stator module 1b, to house a single coil 3b, includes a stator outer peripheral portion 11b, a stator bottom portion 12b, a stator top portion 13b, a stator inner peripheral portion 14b, and a pair of stator side portions 15b.

The stator outer peripheral portion 11b is a plate-like member curved so as to constitute a part of a cylindrical shape (hollow columnar shape) that forms an outer peripheral side wall of the stator module 1b. The stator bottom portion 12b is roughly substantially an arc-shaped plate-like member having a prescribed width that forms a lower wall (bottom wall) of the stator module 1b and a lower coolant passage portion 16b. An outer peripheral side portion in the arc-shaped plate-like member of this stator bottom portion 12b protrudes outward in the axial direction over the entire periphery to form a lower arc-shaped protrusion portion 121b, and an internal space of this lower arc-shaped protrusion portion 121b serves as the lower coolant passage portion 16b. The lower coolant passage portion 16b is space for allowing a coolant to flow through the through passage 32. In the lower arc-shaped protrusion portion 121b of the stator bottom portion 12b, a supply discharge port 18b is formed therethrough to supply and discharge coolant for the lower coolant passage portion 16b, and this supply discharge port 18b is connected to a joint 91b. The stator bottom portion 13b is roughly substantially an arc-shaped plate-like member having a prescribed width that forms an upper wall (top wall) of the stator module 1b and an upper coolant passage portion 17b. An outer peripheral side portion in the arc-shaped plate-like member of this stator top portion 13b protrudes outward in the axial direction over the entire periphery to form an upper arc-shaped protrusion portion 131b, and an internal space of this upper arc-shaped protrusion portion 131b serves as an upper coolant passage portion 17b. The upper coolant passage portion 17b is space for allowing a coolant to flow through the through passage 32. In the lower arc-shaped protrusion portion 131b of the stator bottom portion 13b, a supply discharge port 19b is provided therethrough to supply and discharge coolant for the upper coolant passage portion 17b, and this supply discharge port 19b is connected with a joint 92b. In these joints 91b and 92b, a through passage is formed in the axial direction. A stator inner peripheral portion 14b is a plate-like member curved so as to constitute a part of a cylindrical shape (hollow columnar shape) that forms an inner peripheral side wall of the stator module 1b. Its radius is smaller than that of the stator outer peripheral portion 11b. The pair of stator side portions 15b is each a plate-like member that forms a side wall of the stator module 1b.

The stator bottom portion 12b and the stator top portion 13b are spaced a prescribed distance apart so as to face each other in the rotation axis direction. An inner peripheral end of the stator bottom portion 12b is joined to one end (lower end) of the stator inner peripheral portion 14b, and an outer peripheral end (an end of the lower arc-shaped protrusion portion 121b) of the stator bottom portion 12b is joined to one end (lower end) of the stator outer peripheral portion 11b. Ends at both sides of the stator bottom portion 12b are joined to ends (lower ends) of the pair of stator side portions 15b. An inner peripheral end of the stator top portion 13b is joined to the other end (upper end) of the stator inner peripheral portion 14b, and an outer peripheral end (an end of the upper arc-shaped protrusion portion 131b) of the stator bottom portion 13b is joined to the other end (upper end) of the stator outer peripheral portion 11b. Edges at both sides of the stator top portion 13b are joined to the other ends (upper ends) of the pair of stator side portions 15b. The stator outer peripheral portion 11b, the stator bottom portion 12b, the stator top portion 13b, the stator inner peripheral portion 14b, and the pair of stator side portions 15b, which are thus joined, form internal space, which forms an accommodation space that houses one cored coil 3b. Thus, the shape of the pair of stator side portions 15b as seen from the circumferential direction is equivalent to a cross-sectional shape (the shape as seen from the circumferential direction) of the internal space taken along a cross-section line of the radial direction.

The stator outer peripheral portion 11b, the stator bottom portion 12b, the stator top portion 13b, the stator inner peripheral portion 14b, and the pair of stator side portions 15b may, for example, be formed separately and joined and fixed to one another with, for example, an adhesive. Alternatively, for example, part of the stator outer peripheral portion 11b, the stator bottom portion 12b, the stator top portion 13b, the stator inner peripheral portion 14b, and the pair of stator partition wall portions 15b may be formed integrally. Alternatively, the stator module 1b may be divided into two, upper and lower members and formed of the two members. Alternatively, a core 5 of the coil 3b may also be formed integrally with the stator bottom portion 12b or the stator top portion 13b.

The coil 3b housed in the stator module 1b thus configured may have a single pancake structure as in the coil 3a of the first embodiment. In the example shown in FIG. 5 and FIG. 7, the coil 3b has what is called a double pancake structure, where a band-shaped conductor member are wound into two layers of upper and lower coils. Between the upper coil and the lower coil in this double pancake coil 3b, an arc-shaped plate-like protrusion member 33 having a prescribed width is disposed. The coils 3b has a through passage 32 penetrating in the axial direction of the coil 3b, the through passages 32 being included in prescribed turns in a portion of the coil 3b that corresponds to an outer side (the outer side of a stator composed of the plurality of stator modules 1b) in the radial direction of the stator module 1b relative to a core portion of the coil 3b. The protrusion member 33 also has a through opening formed therethrough at a position corresponding to the through passage 32.

Within the through passage 32, a shape maintaining member (spacer) 4a is provided for maintaining the shape of the through passage 32. The coil 3b is a cored coil having the core 5 formed of magnetic substance at the core portion.

The coil 3b is housed in the accommodation space (slot) formed by the stator outer peripheral portion 11b, the stator bottom portion 12b, the stator top portion 13b, the stator inner peripheral portion 14b, and the stator side portions 15b, so as to position, between the lower coolant passage portion 16b and the upper coolant passage portion 17b, the portion of the coil 3b that corresponds to the outer side in the radial direction of the stator module 1b relative to the core portion of the coil 3b. An end surface of the interposition member 33 comes in contact with each of the stator outer peripheral portion 11b, the stator bottom portion 12b, the stator top portion 13b, the stator inner peripheral portion 14b, and the stator side portions 15b, and is thermal welded to those members, as shown in FIG. 5C.

The stator in the OR type AG motor Mb in the second embodiment is formed by joining the plurality of stator modules 1b so as to position the plurality of coils 3a in turn in the circumferential direction. Between stator modules adjoining to each other in the circumferential direction the joints 91b provided at the supply discharge ports 18b of the lower arc-shaped protrusion portions 121b are connected to each other in a communicable manner by communication tubes 93 (not shown). The connection is made for each pair, except one pair, in turn in one direction along the circumferential direction. Further, between stator modules adjoining to each other in the circumferential direction, and yet, for pairs that are not communicated through the joints 91b with each other by the communication tubes 93, the joints 92b provided at the supply discharge ports 19b of the upper arc-shaped protrusion portions 131b are connected to each other in a communicable manner by the communication tubes 94. The connection is made for each pair, except the one pair, in turn in one direction along the circumferential direction. Joints 91b in the pair of stator modules 1b that have been left are connected to a heat exchanger, not shown, through a piping. The communication tubes 93 and 94 are an example of the communicating joint portion between coils 3b adjoining to each other in turn in circumferential direction in the plurality of coils 3b, the communicating joint portion joining, in a communicable manner, a discharge port corresponding to one coil 3b to a supply port corresponding to a coil 3b adjoining to the one coil 3b at one side in the circumferential direction of the one coil 3b.

The OR type AG motor Mb thus configured, during operation, is supplied with a prescribed coolant, from the heat exchanger, not shown, through a joint 91b of one of the one pair of stator modules that has been left. This supplied coolant flows from the lower coolant passage portion 16b in the stator module 1b (stator module 1b-1) with the joint 91b that has been left, through the through passage 32 of the coil 3b housed in the stator module 1b-1, and to the upper coolant passage portion 17b in the stator module 1b-1. The coolant, when flowing through the through passage 32 of this coil 3b, draws heat from the conductor member 31 of the coil 3b to provide cooling for the coil 3b. The coolant that has flowed into the upper coolant passage portion 17b is discharged from the supply discharge port 19b and the joint 92b for that upper coolant passage portion 17b, and via the communication tube 94, the coolant is supplied, through a joint 92b and a supply discharge port 19b for an upper coolant passage portion 17b in a stator module 1b (stator module 1b-2) adjoining to the stator module 1b-1 at one side in the circumferential direction, and to the upper coolant passage portion 17b in the stator module 1b-2.

The coolant that has been supplied to the upper coolant passage portion 17b in the stator module 1b-2 flows from this upper coolant passage portion 17b, through the through passage 32 of the coil 3b housed in the stator module 1b-2, and to the lower coolant passage portion 16b in the stator module 1b-2. The coolant, when flowing through the through passage 32 of this coil 3b, draws heat from the conductor member 31 of the coil 3b to provide cooling for the coil 3b. The coolant that has flowed into the lower coolant passage portion 16b is discharged from the supply discharge port 18b and the joint 91b for that lower coolant passage portion 16b, and via the communication tube 93, the coolant is supplied, through a joint 91b and a supply discharge port 18b for a lower coolant passage portion 16b in a stator module 1b (stator module 1b-3) adjoining to the stator module 1b-2 at one side in the circumferential direction, and to the lower coolant passage portion 16b in the stator module 1b-3.

The coolant that has been supplied to the lower coolant passage portion 16b in the stator module 1b-3 similarly flows, from this lower coolant passage portion 16b, through the through passage 32 of the coil 3b housed in the stator module 1b-3, and to the upper coolant passage portion 17b in the stator module 1b-3. The coolant, when flowing through the through passage 32 of this coil 3b, draws heat from the conductor member 31 of the coil 3b to provide cooling for the coil 3b. The coolant that has flowed into the upper coolant passage portion 17b is discharged from the supply discharge port 19b and the joint 92b for that upper coolant passage portion 17b, and via the communication tube 94, the coolant is supplied, through a joint 92b and a supply discharge port 19b for an upper coolant passage portion 17b in a stator module 1b (stator module 1b-4) adjoining to the stator module 1b-3 at one side in the circumferential direction, and to the upper coolant passage portion 17b in the stator module 1b-4.

The coolant that has been supplied to the upper coolant passage portion 17b in the stator module 1b-4 similarly flows from the upper coolant passage portion 17b, through the through passage 32 of the coil 3b housed in the stator module 1b-4, and to the lower coolant passage portion 16b in the stator module 1b-4. The coolant, when flowing through the through passage 32 of this coil 3b, draws heat from the conductor member 31 of the coil 3b to provide cooling for the coil 3b. The coolant that has flowed into the lower coolant passage portion 16b is discharged from the supply discharge port 18b and the joint 91b for that lower coolant passage portion 16b, and via the communication tube 93, the coolant is supplied, through a joint 91b and a supply discharge port 18b for a lower coolant passage portion 16b in a stator module 1b (stator module 1b-5) adjoining to the stator module 1b-4 at one side in the circumferential direction, and to the lower coolant passage portion 16b in the stator module 1b-5.

Subsequently, the coolant similarly flows through the lower coolant passage portion 16b (the upper coolant passage portion 17b), the through passage 32, and the upper coolant passage portion 17b (the lower coolant passage portion 16b) in the stator modules 1b in turn in one direction along the circumferential direction. The coolant thus provides cooling for the coils 3b housed in the stator modules 1b, and is supplied to the upper coolant passage portion 17b in a stator module 1b (stator module 1b-12) in the other stator module of the one pair of stator modules 1b that has been left. The coolant that has been supplied to the upper coolant passage portion 17b in the stator module 1b-12 flows from this upper coolant passage portion 17b, through the through passage 32 of the coil 3b housed in the stator module 1b-12, and to the lower coolant passage portion 16b in the accommodation space L. The coolant, when flowing through the through passage 32 of this coil 3b, draws heat from the conductor member 31 of the coil 3b to provide cooling for the coil 3b. The coolant that has flowed into the lower coolant passage portion 16b is discharged from that joint 91b to return to the heat exchanger, not shown.

The OR type AG motor Mb thus configured in the second embodiment brings about working effects similar to those in the OR type AG motor Ma in the first embodiment. Further, in the OR type AG motor Mb in the second embodiment, the stator is formed in modules for each individual coil 3b. This brings about a cost benefit in production and inspection with the volume efficiency in comparison to the production and inspection of stator units, and thus achieves lower costs. Further, in a case of a malfunction of the stator, the OR type AG motor Mb in the second embodiment only needs the replacement of a stator module 1b where the malfunction has arisen, instead of the replacement of an entire stator, facilitating the maintenance and management.

Next, still another embodiment will be described.

Third Embodiment

FIG. 8 is views for illustrating the configuration of an OR type AG motor according to a third embodiment. FIG. 8A is a sectional view of a half part, relative to the rotation axis, of the OR type AG motor according to the third embodiment, FIG. 8B is an enlarged transverse sectional view showing a part of a coil 3c and its surroundings, and FIG. 8C is an enlarged longitudinal sectional view of a part of the coil 3c and its surroundings.

The OR type AG motor Mc in the third embodiment includes a stator 1c and a pair of rotors 2-1 and 2-2. This pair of rotors 2-1 and 2-2 is similar to the pair of rotors 2-1 and 2-2 of the OR type AG motor Ma in the first embodiment, and thus description thereof is omitted.

Whereas the OR type AG motor Ma in the first embodiment includes a cylindrical member or the shape maintaining member 4a within the through passage 32 of the coil 3a, the OR type AG motor Mc in the third embodiment includes a shape maintaining member 4c that is a plate-like member having a side longer than the width of a conductor member 31 within a through passage 32 of a coil 3c.

Although the OR type AG motor Mc thus configured in the third embodiment can be formed by providing the OR type AG motor Mb in the second embodiment with the shape maintaining member 4c, the OR type AG motor in the third embodiment in an example shown in FIG. 8 is formed by providing the OR type AG motor Ma in the first embodiment with the shape maintaining member 4c.

More specifically, to house a plurality of coils 3c the stator 1c includes a stator outer peripheral portion 11c, a stator bottom portion 12c, a stator top portion 13c, a stator inner peripheral portion 14c, and stator partition wall portions 15c. These constituent members are similar to the stator outer peripheral portion 11a, the stator bottom portion 12a, the stator top portion 13a, the stator inner peripheral portion 14a, and the stator partition wall portions 15a in the first embodiment, and thus description thereof is omitted.

Each of the plurality of coils 3c is constituted by winding a band-shaped conductor member 31 via an insulating member such that the width direction of the conductor member 31 runs along the axial direction of the coil 3c, and in this regard, the winding is made with the shape maintaining member 4c between prescribed turns in a portion of the coil 3c that corresponds to an outer side in the radial direction of the stator 1c relative to a core portion of the coil 3c.

The shape maintaining member 4c thus configured, which is a plate-like member having a side longer than the width of the band-shaped conductor member 31, has a portion extending outward relative to the coil 3c at least at one side in the axial direction in the coil 3c, or in the example shown in FIG. 8, at both sides in the axial direction. Accordingly, the OR type AG motor Mc in the third embodiment uses, as a dissipation plate, the portion of the shape maintaining member 4c that extends outward relative to the coil 3c, thus improving a cooling efficiency. The OR type AG motor Mc in the third embodiment allows this portion to fix the conductor member 31 to prevent vibration, thus facilitating the assembly.

The OR type AG motor Mc thus configured in the third embodiment brings about working effects similar to those in the OR type AG motor Ma in the first embodiment.

It is noted that providing the shape maintaining member 4c thus configured within the through passage 32 can cause a coolant to fail to fully flow within the through passage 32. In this case, by dividing the coolant passage portion into upper and lower portions as in the OR type AG motor Md in the fourth embodiment, a coolant is preferably caused to flow in the circumferential direction, as shown in FIG. 8C.

Next, still another embodiment will be described.

Fourth Embodiment

Figure 9:
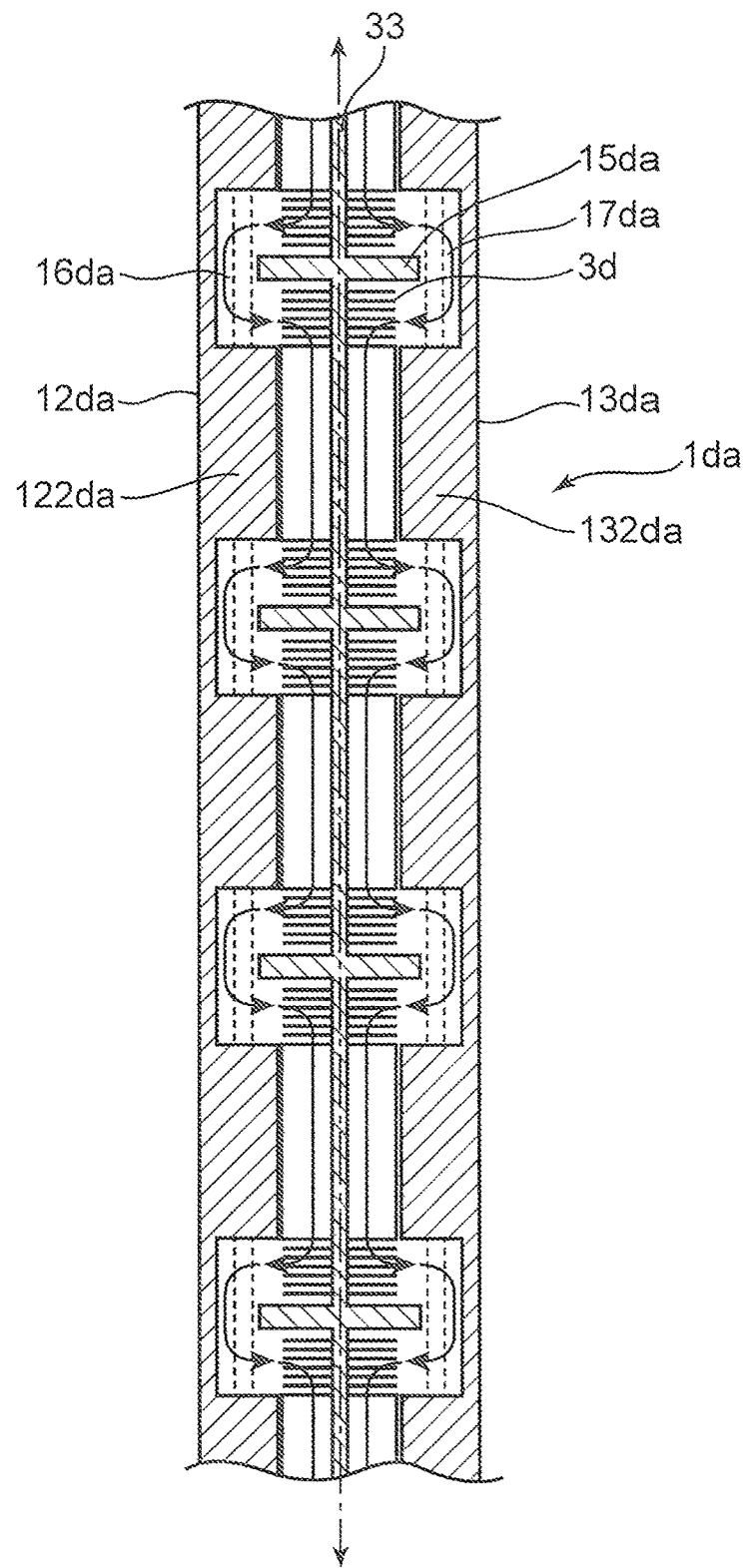
FIG. 9 is a view for illustrating the configuration of an OR type AG motor according to a fourth embodiment.
Figure 10:
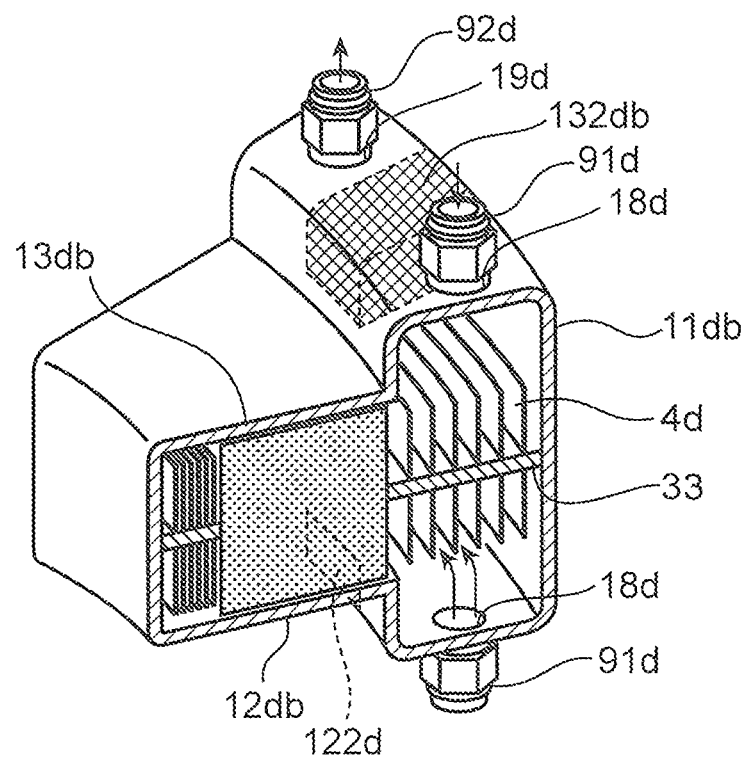
FIG. 10 is a partial, perspective, sectional view showing a part of a stator in the OR type AG motor according to the fourth embodiment.

FIG. 9 is a view for illustrating the configuration of an OR type AG motor according to a fourth embodiment. FIG. 10 is a partial, perspective, sectional view showing a part of a stator in the OR type AG motor according to the fourth embodiment.

The OR type AG motor Md in the fourth embodiment includes a stator 1d and a pair of rotors 2-1 and 2-2. This pair of rotors 2-1 and 2-2 is similar to the pair of rotors 2-1 and 2-2 of the OR type AG motor Ma in the first embodiment, and thus description thereof is omitted.

Whereas the OR type AG motor Ma in the first embodiment joins coolant passage portions into a single passage portion by forming the supply discharge ports 18a and 19a in the stator partition wall portions 15a at upper and lower positions in a staggered configuration, the OR type AG motor Md in the fourth embodiment includes coolant passage portions. For example, the coolant passage portions may be configured of two, upper and lower constituents, or alternatively, may be configured of constituents for every accommodation space (slot) of coils 3, or for every several accommodation spaces (slots), for example.

More specifically, in a case where the refrigerant passage portions is, for example, configured of two, upper and lower constituents, the stator 1da (refer to FIG. 9) includes, to house the plurality of coils 3d, a stator outer peripheral portion 11da (not shown), a stator bottom portion 12da (not shown), a stator top portion 13da (not shown), a stator inner peripheral portion 14da (not shown), and stator partition wall portions 15da. Although these constituent members are similar to the stator outer peripheral portion 11a, the stator bottom portion 12a, a stator top portion 13a, the stator inner peripheral portion 14a, and stator partition wall portions 15a in the first embodiment and thus description thereof is omitted, the stator 1da differs from that of the first embodiment in that the stator module 1db further includes: a lower flow-direction regulator 122*da* inside a lower annular protrusion portion 121*da* (not shown); an upper flow-direction regulator 132*da* inside an upper annular protrusion portion 131*da* (not shown); and the stator partition wall portions 15*da* further include supply discharge ports 18*a* and 19*a* above and below.

The lower flow-direction regulator 122*da* is a member formed, inside the lower annular protrusion portion 121*da*, so as to protrude in the axial direction at a middle portion in the circumferential direction. The upper flow-direction regulator 132*da* is a member formed, inside the upper annular protrusion portion 131*da*, so as to protrude in the axial direction at a middle portion in the circumferential direction. Each of the plurality of coils 3*d* is a double pancake coil, and, within the through passage 32 in the coil 3*da*, there is a shape maintaining member 4*d* similar to the shape maintaining member 4*c*, which also functions as a dissipation plate, as described in the third embodiment.

In this configuration, in the lower coolant passage portion 16*da*, the coolant that has been supplied from the supply discharge port 18*a* formed in the stator partition wall portion 15*da* at one side is provided with a flow direction component toward the axial direction by the lower flow-direction regulator 122*da* to come in contact with the portion of the shape maintaining member 4*d* that functions as a dissipation plate, and then, the coolant is discharged from a supply discharge port 18*a* formed in a stator partition wall portion 15*da* at the other side and supplied to an adjacent accommodation space (slot). In the lower coolant passage portion 17*da*, the coolant that has been supplied from the supply discharge port 19*a* formed in the stator partition wall portion 15*da* at one side is provided with a flow direction component toward the axial direction by the upper flow-direction regulator 132*da* to come in contact with the portion of the shape maintaining member 4*d* that functions as a dissipation plate, and then, the coolant is discharged from a supply discharge port 19*a* formed in a stator partition wall portion 15*da* at the other side and supplied to an adjacent accommodation space (slot).

Alternatively, for example, in a case the stator module 1*db*, where the coolant passage portion is formed for every accommodation space (slot), the stator module 1*db* includes, to house the coil 3*d*, a stator outer peripheral portion 11*db*, a stator bottom portion 12*db*, a stator top portion 13*db*, a stator inner peripheral portion 14*db*, and a pair of stator sides 15*db*. Although these constituent members are similar to the stator outer peripheral portion 11*b*, the stator bottom portion 12*b*, a stator top portion 13*b*, the stator inner peripheral portion 14*b*, and the stator side portions 15*b* in the second embodiment and thus description thereof is omitted, the stator 1*db* differs from that of the second embodiment in that the stator module 1*db* further includes: a lower flow-direction regulator 122*db* inside a lower annular protrusion portion 121*db*; a supply discharge port 18*d* and a joint 91*d* similar to the supply discharge port 18*b* and the joint 91*b*, and in addition, a supply discharge port 19*d* and a joint 92*d* similar to the supply discharge port 19*b* and joint 92*b*; an upper flow-direction regulator 132*db* inside an upper annular protrusion portion 131*db*; and a supply discharge port 19*d* and a joint 92*d* similar to the supply discharge port 19*b* and the joint 92*b*, and in addition, a supply discharge port 18*d* and a joint 91*d* similar to the supply discharge port 18*b* and joint 91*b*.

The lower flow-direction regulator 122*db* is a member formed in a portion between the supply discharge port 18*d* (the joint 91*d*) and the supply discharge port 19*d* (the joint 92*d*) in the circumferential direction, inside the lower annular protrusion portion 121*db*, so as to protrude in the axial direction. The upper flow-direction regulator 132*da* is a member formed in a portion between the supply discharge port 18*d* (the joint 91*d*) and the supply discharge port 19*d* (the joint 92*d*) in the circumferential direction, inside the upper annular protrusion portion 131*da*, so as to protrude in the axial direction.

In this configuration, in the lower coolant passage portion 16*db*, a coolant that has been supplied through the joint 91*d* and the supply discharge port 18*d* is regulated in its flow direction component so as to flow toward the shape maintaining member 4*d* by the lower flow-direction regulator 122*db* to come in contact with the portion of the shape maintaining member 4*d*, which functions as a dissipation plate, and then, the coolant is discharged from the supply discharge port 19*d* and the joint 92*d*. In the upper coolant passage portion 17*db*, a coolant that has been supplied through the joint 91*d* and the supply discharge port 18*d* is regulated in its flow direction component so as to flow toward the shape maintaining member 4*d* by the upper flow-direction regulator 132*da* to come in contact with the portion of the shape maintaining member 4*d* that functions as a dissipation plate, and then, the coolant is discharged from the supply discharge port 19*d* and the joint 92*d*.

The OR type AG motor Md thus configured in the fourth embodiment brings about working effects similar to those in the OR type AG motor Ma in the first embodiment.

Next, still another embodiment will be described.

Fifth Embodiment

Figure 11:
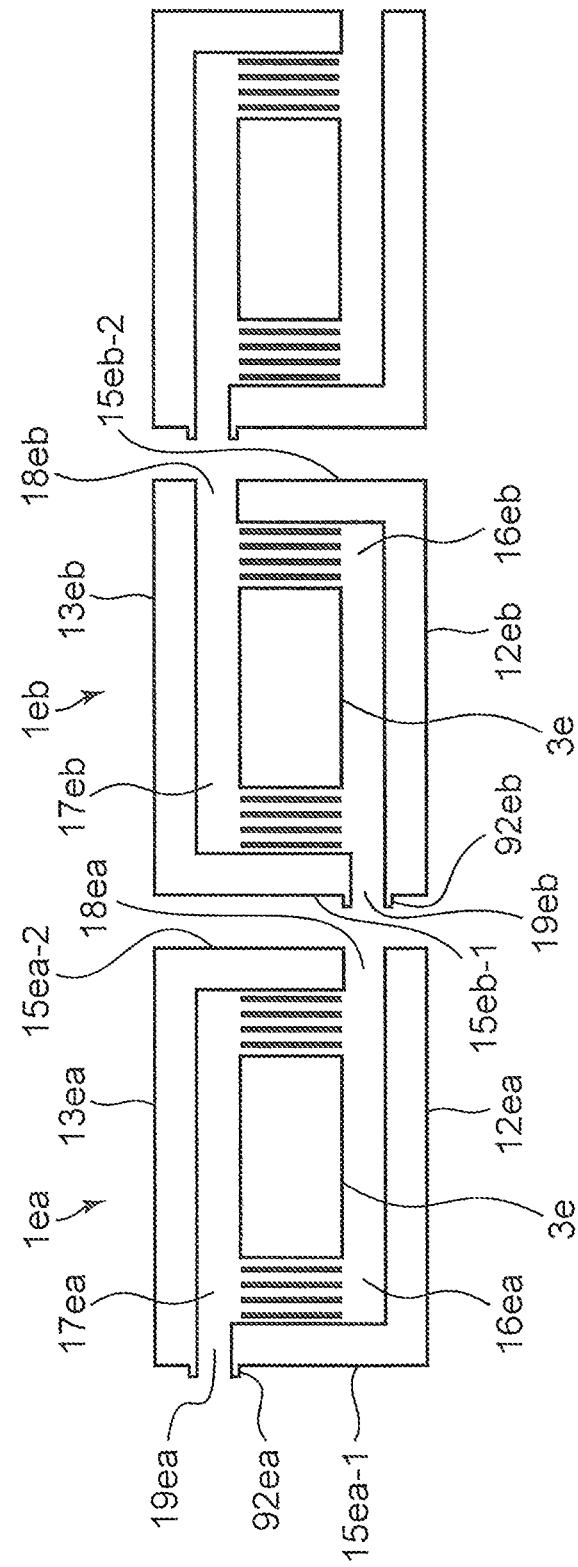
FIG. 11 is a sectional view showing stator modules in an OR type AG motor according to a fifth embodiment.

FIG. 11 is a sectional view showing stator modules in an OR type AG motor according to a fifth embodiment.

The OR type AG motor Me in the fifth embodiment includes a stator composed of a plurality of stator modules 1*e* and a pair of rotors 2-1 and 2-2. This pair of rotors 2-1 and 2-2 is similar to the pair of rotors 2-1 and 2-2 of the OR type AG motor Ma in the first embodiment, and thus description thereof is omitted.

Whereas the supply discharge port 18*b* and the joint 91*b*, and the supply discharge port 19*b* and joint 92*b* in the OR type AG motor Mb in in the second embodiment are provided in the axial direction, a supply discharge port 18*e*, a supply discharge port 19*e*, and a joint 92*e* in the OR type AG motor Me in in the fifth embodiment are provided in the circumferential direction.

More specifically, a stator module 1*e* includes two different stator modules 1*ea* and 1*eb*, as shown in FIG. 11.

The stator module 1*ea* includes, to house a coil 3*e*, a stator outer peripheral portion 11*ea*, not shown, a stator bottom portion 12*ea*, a stator top portion 13*ea*, a stator inner peripheral portion 14*ea*, and a pair of stator side portions 15*ea*-1 and 15*ea*-2. Although these constituent members are similar to the stator outer peripheral portion 11*b*, the stator bottom portion 12*b*, a stator top portion 13*b*, the stator inner peripheral portion 14*b*, and the pair of stator side portions 15*b* in the second embodiment and thus description thereof is omitted, the stator module 1*ea* differs from that of the second embodiment in that the stator module 1*ea* further includes: a supply discharge port 19*ea* and a joint 92*ea* in one of the pair of stator side portions 15*ea*-1 and 15*ea*-2, or for example in the stator side portion 15*ea*-1; and a supply discharge port 18*ea* in the other of the pair of stator side portions 15*ea*-1 and 15*ea*-2, or for example, in the stator side portion 15*ea*-2, and in that the stator module 1*ea* does not include: a supply discharge port 18*b* and the joint 91*b* in the stator bottom portion 12*ea*; or a supply discharge port 19*b* and the joint 92*b* in the stator top portion 12*ea*. The coil 3*e* is similar to the single pancake coil 3*a*, the double pancake coil 3*b*, and the like.

A supply discharge port 19*ea*, to supply and discharge a coolant for an upper coolant passage portion 17*ea*, is formed through the stator side portion 15*ea*-1, at a position (an upper position) in the stator side 15*ea*-1 that corresponds to a position where the upper coolant passage portion 17*ea* is formed, and to this supply discharge port 19*ea*, the joint 92 *ea* is connected. The supply discharge port 18*ea*, to supply and discharge a coolant for the lower coolant passage portion 16*ea*, is formed through the stator side portion 15*ea*-2, at a position (a lower position) in the stator side portion 15*ea*-2 that corresponds to a position where the lower coolant passage portion 16*ea* is formed, so as to connect to the joint 92 *ea*.

The stator module 1*eb* includes, to house a coil 3*e*, a stator outer peripheral portion 11*eb*, not shown, a stator bottom portion 12*eb*, a stator top portion 13*eb*, a stator inner peripheral portion 14*eb*, and a pair of stator side portions 15*eb*-1 and 15*eb*-2. Although these constituent members are similar to the stator outer peripheral portion 11*b*, the stator bottom portion 12*b*, a stator top portion 13*b*, the stator inner peripheral portion 14*b*, and the pair of stator side portions 15*b* in the second embodiment and thus description thereof is omitted, the stator module 1*eb* differs from that of the second embodiment in that the stator module 1*eb* further includes: a supply discharge port 19*eb* and a joint 92*eb* in one of the pair of stator side portions 15*eb*-1 and 15*eb*-2, or for example in the stator side portion 15*eb*-1; and a supply discharge port 18*eb* in the other of the pair of stator side portions 15*eb*-1 and 15*eb*-2, or for example, in the stator side portion 15*eb*-2, and in that the stator module 1*eb* does not include: a supply discharge port 18*b* and the joint 91*b* in the stator bottom portion 12*eb*; or a supply discharge port 19*b* and the joint 92*b* in the stator top portion 12*eb*.

A supply discharge port 19*eb*, to supply and discharge a coolant for a lower coolant passage portion 17*eb*, is formed through the stator side portion 15*eb*-1, at a position (a lower position) in the stator side 15*eb*-1 that corresponds to a position where the lower coolant passage portion 17*eb* is formed, and to this supply discharge port 19*eb*, the joint 92*eb* is connected. The supply discharge port 18*eb*, to supply and discharge a coolant for the lower coolant passage portion 16*eb*, is formed through the stator side portion 15*eb*-2, at a position (an upper position) in the stator side portion 15*ea*-2 that corresponds to a position where the upper coolant passage portion 16*eb* is formed, so as to connect to the joint 92 *eb*.

The stator in the OR type AG motor Me in the fifth embodiment is formed by alternately disposing the stator modules 1*ea* and the stator modules 1*eb* so as to position the coils 3*e* in turn in the circumferential direction, and connecting the supply discharge port 18*e* to the joint 92*e* and joining the stator modules 1*ea* and the stator modules 1*eb* in turn in the circumferential direction.

The OR type AG motor Me thus configured in the fifth embodiment brings about working effects similar to those in the OR type AG motor Ma in the first embodiment. In addition, the OR type AG motor Me thus configured in the fifth embodiment eliminates the need for external piping such as the communication tubes 93 and 94 in the OR type AG motor Mb in the second embodiment, achieving a higher density as an entire motor.

Next, still another embodiment will be described.

Sixth Embodiment

Figure 12:
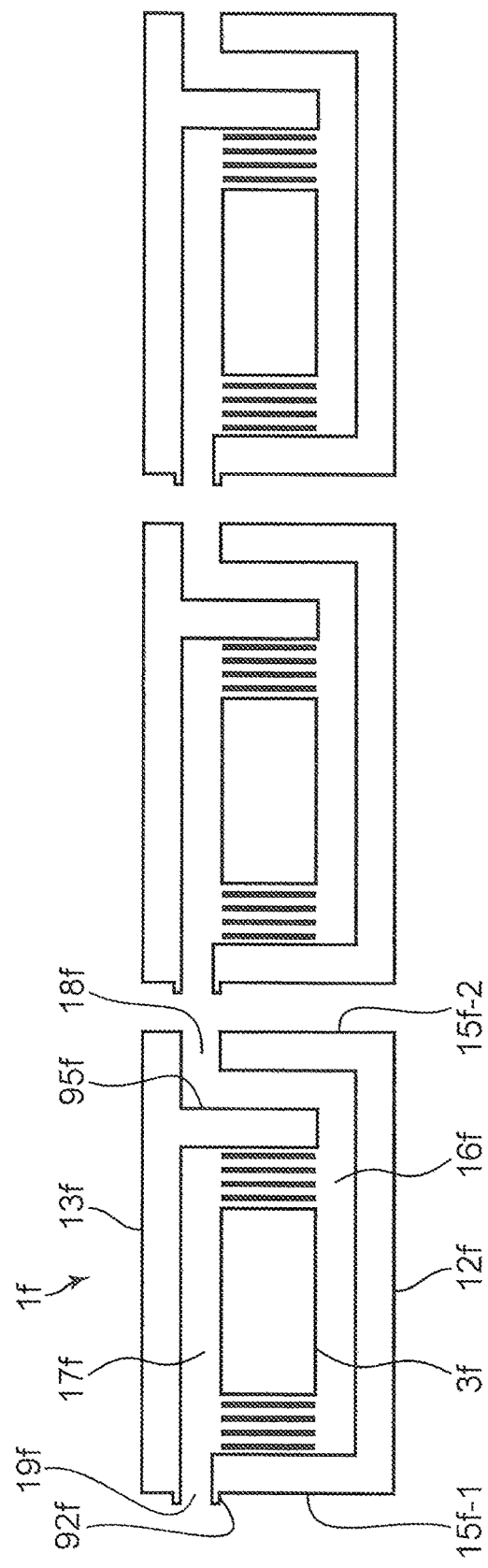
FIG. 12 is a sectional view showing stator modules in an OR type AG motor according to a sixth embodiment.

FIG. 12 is a sectional view showing stator modules in an OR type AG motor according to a sixth embodiment.

An OR type AG motor Mf in the sixth embodiment includes a stator composed of a plurality of stator modules 1*f* and a pair of rotors 2-1 and 2-2. This pair of rotors 2-1 and 2-2 is similar to the pair of rotors 2-1 and 2-2 of the OR type AG motor Ma in the first embodiment, and thus description thereof is omitted.

Whereas the supply discharge port 18*b* and the joint 91*b*, and the supply discharge port 19*b* and joint 92*b* in the OR type AG motor Mb in in the second embodiment are provided in the axial direction, a supply discharge port 18*f*, a supply discharge port 19*f*, and a joint 92*f* in the OR type AG motor Mf in in the sixth embodiment are provided in the circumferential direction, as in the OR type AG motor Me in in the fifth embodiment. Meanwhile, although, in the fifth embodiment, the two different stator modules 1*ea* and 1*eb* are required as the plurality of stator modules 1*e* that forms the stator, in the sixth embodiment, only a single identical shape can be used for a plurality of stator modules 1*f* that forms the stator.

More specifically, the stator module 1*f* includes, as shown in FIG. 12, to house a coil 3*f*, a stator outer peripheral portion 11*f*, not shown, a stator bottom portion 12*f*, a stator top portion 13*f*, a stator inner peripheral portion 14*f*, and a pair of stator side portions 15*f*-1 and 15*f*-2. Although these constituent members are similar to the stator outer peripheral portion 11*b*, the stator bottom portion 12*b*, a stator top portion 13*b*, the stator inner peripheral portion 14*b*, and the pair of stator side portions 15*b* in the second embodiment and thus description thereof is omitted, the stator module 1*f* differs from that of the second embodiment in that the stator module 1*b* further includes: a supply discharge port 19*f* and a joint 92*f* in one of the pair of stator side portions 15*f*-1 and 15*f*-2, or for example in the stator side portion 15*f*-1; and a supply discharge port 18*f* in the other of the pair of stator side portions 15*f*-1 and 15*f*-2, or for example, in the stator side portion 15*f*-2, and in that the stator module 1*f* does not include: a supply discharge port 18*b* and the joint 91*b* in the stator bottom portion 12*f*; or a supply discharge port 19*b* and the joint 92*b* in the stator top portion 12*f*. The coil 3*f* is similar to the single pancake coil 3*a*, the double pancake coil 3*b*, and the like.

The supply discharge port 19*f*, to supply and discharge a coolant for an upper coolant passage portion 17*f*, is formed through the stator side portion 15*f*-1, at a position (an upper position) in the stator side 15*f*-1 that corresponds to a position where the upper coolant passage portion 17*f* is formed, and to this supply discharge port 19*f*, the joint 92*f* is connected. The supply discharge port 18*f*, to supply and discharge a coolant for the lower coolant passage portion 16*f*, is formed through the stator side portion 15*f*-2, at a position (an upper position) in the stator side portion 15*f*-2 that corresponds to a position where the upper coolant passage portion 16*f* is formed, so as to connect to the joint 92*f*. The stator module 1*f* in the sixth embodiment further includes a coolant guide 95*f* to guide, to the lower coolant passage portion 16*f*, a coolant that enters through the supply discharge port 18*f* provided at the position as described. The coolant guide 95*f* is a plate-like member extending, along the axial direction, from an inner surface of the upper arc-shaped protrusion portion 131*f* up to the lower coolant passage portion 16*f*. A coolant supplied from the supply discharge port 18*f* is guided to the lower coolant passage portion 16*f* by this coolant guide 95*f*. A coolant discharged from the supply discharge port 18*f* is guided to the supply discharge port 18*f* by this coolant guide 95*f*.

The stator in the OR type AG motor Mf in the sixth embodiment is formed by connecting the supply discharge port 18*f* to the joint 92*f* so as to position the plurality of coils 3*f* in turn in the circumferential direction, and joining the plurality of stator modules 1*f* in turn in the circumferential direction.

The OR type AG motor Mf thus configured in the sixth embodiment brings about working effects similar to those in the OR type AG motor Ma in the first embodiment. The OR type AG motor Mf thus configured in the sixth embodiment, as in the OR type AG motor Me in the fifth embodiment, eliminates the need for external piping such as the communication tubes 93 and 94 in the OR type AG motor Mb in the second embodiment, achieving a higher density in an entire motor. The OR type AG motor Mf in the sixth embodiment uses the plurality stator modules 1*f* of an identical shape, and this leads improved efficiency in volume production.

The present description discloses techniques in various modes as described. Among these, main techniques will now be summarized.

An outer rotor-type axial gap brushless motor according to a mode including a stator including a plurality of coils disposed in a circumferential direction; and a pair of first and second rotors including a plurality of magnets disposed in the circumferential direction, the pair of first and second rotors being respectively disposed on both sides of the stator with a prescribed distance therebetween in a rotation axis direction so as to have a common rotation axis, wherein each of the plurality of coils is constituted by winding a band-shaped conductor member via an insulating member such that the width direction of the conductor member runs along the axial direction of the coil, and has a through passage which penetrates in the axial direction of the coil and which is included between prescribed turns in a portion of the coil that corresponds to an outer side in a radial direction of the stator relative to a core portion of the coil.

The outer rotor-type axial gap brushless motor (OR type AG motor) thus configured includes, in each of the plurality of coils, a through passage which penetrates in the axial direction of the coil and which is included between prescribed turns in a portion (outer portion in the radial direction, coil end portion) of the coil that corresponds to an outer side in a radial direction of the stator relative to a core portion of the coil. In one coil, a single through passage may be provided, or alternatively multiple through passages may be provided. The through passage may be provided every turn, alternatively every several turns, or alternatively every random number of turns. The through passage thus configured allows a portion (contact portion) of the band-shaped conductor member that is in contact with the through passage to have the function of dissipating heat and thus to be used as a dissipation plate. The conductor member, which is typically a thermal conductor excellent in thermal conductivity, conducts heat in a part of the coil (remaining part) that remains except the contact portion, to the contact portion to dissipate heat with the contact portion. In particular, although heat in a portion of the coil (inner portion in the radial direction) that corresponds to the inner side in the radial direction of the stator relative to the core portion of the coil is typically difficult to dissipate, the OR type AG motor suitably allows heat in the inner portion in the radial direction to be conducted to the contact portion by means of the band-shaped conductor member to dissipate heat through the contact portion. Thus, the contact portion can have the function of dissipating heat, and thus the OR type AG motor does not need space for forming a flow path of coolant between coils adjoining to each other in the circumferential direction, unlike the OR type AG motor disclosed in Patent Literature 2. Thus, the OR type AG motor allows the space between coils in the circumferential direction to decrease, thus preventing decrease in the coil space factor.

In view of addition of the heat dissipation function, the through passage in the OR type AG motor preferably has a length in a direction along the circumferential direction of the coil than that in a direction along the radial direction. In the OR type AG motor, the through passage is preferably formed by, in winding the conductor member, making winding while leaving a prescribed clearance in the radial direction in the portion of the coil that corresponds to the outer side in the radial direction of the stator relative to the core portion of the coil. In the OR type AG motor thus configured, the band-shaped conductor member come in contact with the through passage at a larger area to dissipate a larger amount of heat.

In the stator in the OR type AG motor in another mode, the stator includes a plurality of stator modules that house the plurality of coils respectively, and is formed by disposing and fixing the plurality of stator modules so as to position the plurality of coils in the circumferential direction.

In the OR type AG motor thus configured, the stator is formed in modules for each individual coil. This brings about a cost benefit in production and inspection with the volume efficiency in comparison to the production and inspection of stator units, and thus achieves lower costs. Further, in a case of a malfunction of the stator, the OR type AG motor thus configured only needs the replacement of a stator module where the malfunction has arisen, instead of the replacement of an entire stator, facilitating the maintenance and management.

In the OR type AG motor in still another mode, the stator includes a coolant passage portion where a coolant passageway for allowing a coolant to flow through the through passage is formed.

The OR type AG motor thus configured, which includes a coolant passage portion, enables forced cooling by the flowing of coolant, achieving an efficient cooling. Thus, the OR type AG motor allows the passage of a large current, achieving a high torque density.

In the OR type AG motor in still another mode, the stator includes a plurality of supply ports respectively corresponding to the plurality of coils and supplying the coolant to the coolant passage portion, and a plurality of discharge ports respectively forming pairs with the plurality of supply ports and discharging the coolant from the coolant passage portion, and a pair of the supply port and the discharge port is provided such that one of the pair is disposed at a first rotor side of the stator that faces the first rotor and the other of the pair is disposed at a second rotor side of the stator that faces the second rotor.

In the OR type AG motor thus configured, one (for example, supply port) of the pair of a supply port and a discharge port is provided at a first rotor side of the stator and the other (in this example, discharge port) of the pair of a supply port and a discharge port is provided at a second rotor side of the stator. Accordingly, a coolant that has entered from the supply port flows through the coolant passage portion along the axial direction. In consequence, the coolant flows in the band-shaped conductor member along its width direction (axial direction) and exits from the discharge port. Thus, the OR type AG motor brings a coolant into contact with the band-shaped conductor member across its entire width direction to effectively provide cooling for the band-shaped conductor member.

In the OR type AG motor in still another mode, the OR type AG motor includes a communicating joint portion between coils adjoining to each other in turn in circumferential direction in the plurality of coils, the communicating joint portion joining, in a communicable manner, a discharge port corresponding to one coil to a supply port corresponding to a coil adjoining to the one coil at one side in the circumferential direction of the one coil.

In the OR type AG motor thus configured, flow paths of coolant are joined into a single path, thus allowing the supply of a coolant with a single external supply port and the discharging of the coolant with a single external discharge port. This simplifies the piping for coolant disposed in surroundings of the OR type AG motor. Thus, this enables the OR type AG motor to become more compact.

In the OR type AG motor in still another mode, each of the plurality of coils further includes a shape maintaining member that is disposed within the through passage and maintains a shape of the through passage. In the OR type AG motor thus configured, each of the plurality of coils is preferably formed by, in winding the conductor member, making winding while interposing the shape maintaining member between the prescribed turns in the portion of the coil that corresponds to the outer side in the radial direction of the stator relative to the core portion of the coil, and leaving a prescribed clearance in the radial direction.

The OR type AG motor thus configured, which includes the shape maintaining member, maintains the through passage even when, for example, receiving an impact and thus maintains the cooling performance.

The present application is filed based on Japanese Patent Application No. 2014-217978 filed Oct. 27, 2014 and the disclosure thereof is incorporated into the present application.

To explicitly indicate the present invention, the present invention is appropriately and fully described with embodiments with reference to the figures. In this regard, however, it should be found that those skilled in the art could easily modify and/or improve the embodiments. Accordingly, it is construed that any modification or improvement made by those skilled in the art within the scope of right recited in the scope of claims is included in the scope of right of the claims.

INDUSTRIAL APPLICABILITY

According to the present invention, an outer rotor-type axial gap brushless motor is provided.

The invention claimed is:

1. An outer rotor-type axial gap brushless motor comprising:
a stator including a plurality of coils disposed in a circumferential direction; and
a pair of first and second rotors including a plurality of magnets disposed in the circumferential direction, the pair of first and second rotors being respectively disposed on both sides of the stator with a prescribed distance therebetween in a rotation axis direction so as to have a common rotation axis, wherein
each of the plurality of coils is constituted by winding a band-shaped conductor member via an insulating member such that a width direction of the conductor member runs along an axial direction of the coil, and has a through passage which penetrates in the axial direction of the coil and which is included between prescribed turns in a portion of the coil that corresponds to an outer side in a radial direction of the stator relative to a core portion of the coil,
the stator includes a coolant passage portion where a coolant passageway for allowing a coolant to flow through the through passage is formed,
the stator includes a plurality of supply ports respectively corresponding to the plurality of coils and supplying the coolant to the coolant passage portion, and a plurality of discharge ports respectively forming pairs with the plurality of supply ports and discharging the coolant from the coolant passage portion, and
a pair of the supply port and the discharge port is provided such that one of the pair is disposed at a first rotor side of the stator that faces the first rotor and the other of the pair is disposed at a second rotor side of the stator that faces the second rotor.

2. The outer rotor-type axial gap brushless motor according to claim 1, wherein
the stator includes a plurality of stator modules that house the plurality of coils respectively, and is formed by disposing and fixing the plurality of stator modules so as to position the plurality of coils in the circumferential direction.

3. The outer rotor-type axial gap brushless motor according to claim 1, comprising
a communicating joint portion between coils adjoining to each other in turn in the circumferential direction among the plurality of coils, the communicating joint portion joining, in a communicable manner, a discharge port corresponding to one coil to a supply port corresponding to a coil adjoining to the one coil at one side in the circumferential direction of the one coil.

4. The outer rotor-type axial gap brushless motor according to claim 1, wherein
each of the plurality of coils further includes a shape maintaining member that is disposed within the through passage and maintains a shape of the through passage.

* * * * *